US011882591B2

United States Patent
Lei et al.

(10) Patent No.: US 11,882,591 B2
(45) Date of Patent: Jan. 23, 2024

(54) TWO-STEP RANDOM ACCESS CHANNEL CONFIGURATION PERIOD

(71) Applicant: QUALCOMM Incorporated, San Diego, CA (US)

(72) Inventors: Jing Lei, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 16/851,955

(22) Filed: Apr. 17, 2020

(65) Prior Publication Data
US 2020/0351948 A1    Nov. 5, 2020

Related U.S. Application Data

(60) Provisional application No. 62/841,019, filed on Apr. 30, 2019.

(51) Int. Cl.
| | |
|---|---|
| H04W 4/00 | (2018.01) |
| H04W 74/00 | (2009.01) |
| H04W 74/08 | (2009.01) |
| H04L 27/26 | (2006.01) |
| H04W 72/20 | (2023.01) |

(52) U.S. Cl.
CPC ......... *H04W 74/006* (2013.01); *H04L 27/261* (2013.01); *H04L 27/2602* (2013.01); *H04W 72/20* (2023.01); *H04W 74/0833* (2013.01)

(58) Field of Classification Search
CPC ......... H04W 74/0833; H04W 72/0406; H04W 74/006; H04L 27/2602; H04L 27/261; H04L 5/0094; H04L 5/0053; H04L 5/0007

USPC .................................. 370/329–330, 335–345
See application file for complete search history.

(56) References Cited

U.S. PATENT DOCUMENTS

| | | | |
|---|---|---|---|
| 2017/0019930 A1 | 1/2017 | Lee et al. | |
| 2020/0351801 A1* | 11/2020 | Jeon | H04W 52/48 |
| 2020/0351955 A1* | 11/2020 | Jeon | H04W 80/02 |

(Continued)

FOREIGN PATENT DOCUMENTS

| | | | |
|---|---|---|---|
| CA | 3061962 A1 * | 11/2018 | ............ H04W 52/04 |
| EP | 3697167 A1 * | 8/2020 | ............ H04W 52/36 |

(Continued)

OTHER PUBLICATIONS

International Search Report and Written Opinion—PCT/US2020/028949—ISAEPO—dated Aug. 13, 2020.

(Continued)

*Primary Examiner* — Thai D Hoang
(74) *Attorney, Agent, or Firm* — Holland & Hart LLP

(57) ABSTRACT

Methods, systems, and devices for wireless communications are described. A user equipment (UE) may receive a configuration message from a base station including periodical configuration information. The UE may identify periodicities for transmitting different portions of a first message of a two-step random access channel (RACH) procedure based on the periodical configuration information, where the different portions include a preamble portion and a payload portion. The UE may transmit the preamble portion of the first message according to a first configuration periodicity and the payload portion of the first message during according to a second configuration periodicity.

62 Claims, 20 Drawing Sheets

(56) References Cited

U.S. PATENT DOCUMENTS

| | | | |
|---|---|---|---|
| 2022/0078840 A1* | 3/2022 | Park | H04W 74/004 |
| 2022/0110184 A1* | 4/2022 | Jeon | H04W 74/0841 |

FOREIGN PATENT DOCUMENTS

| | | | | |
|---|---|---|---|---|
| EP | 3847864 B1 * | 1/2022 | | H04B 17/318 |
| WO | WO-2018175809 A1 | 9/2018 | | |

OTHER PUBLICATIONS

Samsung: "Channel Structure for Two-Step RACH", 3GPP Draft, 3GPP TSG RAN WG1 #96bis, R1-1904392, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 7, 2019 (Apr. 7, 2019), XP051699672, 11 Pages, Retrieved from the Internet: URL: http://www.3gpp.org/ftp/Meetings%5F3GPP%5FSYNC/RAN1/Docs/R1%2D1904392%2Ezip, [retrieved on Apr. 7, 2019], Section 2.1, p. 4.

Sierra Wireless: "Channel Structure for Two-Step RACH Considerations", 3GPP Draft, 3GPP TSG RAN WG1 #96bis, R1-1904819 2-Step RACH Channel Structure, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 7, 2019 (Apr. 7, 2019), XP051699971, 2 Pages, Retrieved from the Internet: URL: http://www.3gpp.org/ftp/Meetings%5F3GPP%5FSYNC/RAN1/Docs/R1%2D1904819%2Ezip, [retrieved on Apr. 7, 2019], Section 3.

Zte, et al., "Considerations on the Channel Structure of msgA", 3GPP draft, 3GPP TSG RAN WG1 Meeting #96, R1-1901626 Considerations on the Channel Structure of MSGA, 3rd Generation Partnership Project (3GPP), Mobile Competence Centre, 650, Route Des Lucioles, F-06921 Sophia-Antipolis Cedex, vol. RAN WG1, No. Athens, Greece, Feb. 25, 2019-Mar. 1, 2019, Feb. 16, 2019 (Feb. 16, 2019), XP051599323, 5 Pages, Retrieved from the Internet: URL: http://www.3gpp.org/ftp/tsg%5Fran/WG1%5FRL1/TSGR1%5F96/Docs/R1%2D1901626%2Ezip, [retrieved on Feb. 16, 2019], Section 2.1.

Zte: "Updated Summary of 7.2.1.1 Channel Structure for Two-step RACH", 3GPP Draft, 3GPP TSG RAN WG1 #96bis, R1-1905793, Updated Summary of 7.2.1.1 Channel Structure for Two-step RACH, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 15, 2019 (Apr. 15, 2019), XP051707841, 36 pages, Retrieved from the Internet: URL: http://www.3gpp.org/ftp/tsg%5Fran/WG1%5FRL1/TSGR1%5F96b/Docs/R1%2D1905793%2Ezip. [retrieved on Apr. 15, 2019] Sect. s 2.1. 2.2.

* cited by examiner

TWO-STEP RANDOM ACCESS CHANNEL CONFIGURATION PERIOD

CROSS REFERENCE

The present Application for Patent claims the benefit of U.S. Provisional Patent Application No. 62/841,019 by LEI et al., entitled "TWO-STEP RANDOM ACCESS CHANNEL CONFIGURATION PERIOD," filed Apr. 30, 2019, assigned to the assignee hereof, and expressly incorporated by reference herein.

BACKGROUND

The following relates generally to wireless communications, and more specifically to a two-step random access channel (RACH) configuration period.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). When connecting to a base station to receive and/or transmit subsequent communications, a UE may perform a RACH procedure to establish the connection with the base station.

SUMMARY

The described techniques relate to improved methods, systems, devices, and apparatuses that support a two-step random access channel (RACH) configuration period. Generally, the described techniques provide for a user equipment (UE) receiving a configuration message from a base station for a two-step RACH procedure. In some cases, the configuration message may include periodical configuration information for transmitting a preamble and a payload, where the preamble and the payload may be associated with a first message of the two-step RACH procedure. In some cases, the base station may transmit the configuration message via radio resource control (RRC) signaling or via a system information (SI) transmission. Subsequently, the UE may identify a first configuration periodicity for transmitting the preamble and a second configuration periodicity for transmitting the payload based on the configuration message. In some cases, the UE may identify the first configuration periodicity based on a relationship with transmitting a message of a four-part RACH procedure (e.g., a periodicity relationship, a frame relationship, a subframe relationship, etc.). Additionally, the UE may identify the second configuration periodicity based on a relationship with the first configuration periodicity. For example, the second configuration periodicity may be the same, or similar to, the first configuration periodicity. After identifying the periodicities, the UE may then transmit the preamble of the first message based on the first configuration periodicity and the payload of the first message based on the second configuration periodicity.

A method of wireless communications at a UE is described. The method may include receiving, from a base station, a configuration message for a two-step RACH procedure, the configuration message including periodical configuration information for transmission of a preamble and transmission of a payload, the preamble and the payload associated with a first message of the two-step RACH procedure, identifying a first configuration periodicity for transmitting the preamble and a second configuration periodicity for transmitting the payload based on the configuration message, and transmitting, to the base station, the preamble of the first message based on the first configuration periodicity and the payload of the first message based on the second configuration periodicity.

An apparatus for wireless communications at a UE is described. The apparatus may include a processor, memory in electronic communication with the processor, and instructions stored in the memory. The instructions may be executable by the processor to cause the apparatus to receive, from a base station, a configuration message for a two-step RACH procedure, the configuration message including periodical configuration information for transmission of a preamble and transmission of a payload, the preamble and the payload associated with a first message of the two-step RACH procedure, identify a first configuration periodicity for transmitting the preamble and a second configuration periodicity for transmitting the payload based on the configuration message, and transmit, to the base station, the preamble of the first message based on the first configuration periodicity and the payload of the first message based on the second configuration periodicity.

Another apparatus for wireless communications at a UE is described. The apparatus may include means for receiving, from a base station, a configuration message for a two-step RACH procedure, the configuration message including periodical configuration information for transmission of a preamble and transmission of a payload, the preamble and the payload associated with a first message of the two-step RACH procedure, identifying a first configuration periodicity for transmitting the preamble and a second configuration periodicity for transmitting the payload based on the configuration message, and transmitting, to the base station, the preamble of the first message based on the first configuration periodicity and the payload of the first message based on the second configuration periodicity.

A non-transitory computer-readable medium storing code for wireless communications at a UE is described. The code may include instructions executable by a processor to receive, from a base station, a configuration message for a two-step RACH procedure, the configuration message including periodical configuration information for transmission of a preamble and transmission of a payload, the preamble and the payload associated with a first message of the two-step RACH procedure, identify a first configuration periodicity for transmitting the preamble and a second configuration periodicity for transmitting the payload based on the configuration message, and transmit, to the base station, the preamble of the first message based on the first configuration periodicity and the payload of the first message based on the second configuration periodicity.

In some examples of the method, apparatuses, and non-transitory computer-readable medium described herein, receiving the configuration message further may include operations, features, means, or instructions for receiving, from the base station, the configuration message via RRC signaling or via an SI transmission.

Some examples of the method, apparatuses, and non-transitory computer-readable medium described herein may further include operations, features, means, or instructions for identifying a transmission gap in the configuration message, the transmission gap indicating a time duration between transmission of the preamble and transmission of the payload, and transmitting, to the base station, the payload of the first message after the identified transmission gap.

In some examples of the method, apparatuses, and non-transitory computer-readable medium described herein, transmitting the preamble and the payload of the first message further may include operations, features, means, or instructions for transmitting, to the base station, the preamble of the first message in at least one RACH occasion, the at least one RACH occasion occurring based on the first configuration periodicity, and transmitting, to the base station, the payload of the first message in at least one uplink shared data channel occasion, the at least one uplink shared data channel occasion occurring based on the second configuration periodicity.

In some examples of the method, apparatuses, and non-transitory computer-readable medium described herein, each RACH occasion may be associated with one or more uplink shared data channel occasions.

Some examples of the method, apparatuses, and non-transitory computer-readable medium described herein may further include operations, features, means, or instructions for identifying the one or more uplink shared data channel occasions associated with each RACH occasion based on a preamble sequence grouping.

In some examples of the method, apparatuses, and non-transitory computer-readable medium described herein, the one or more uplink shared data channel occasions include a same modulation and coding scheme (MCS), payload size, waveform, or a combination thereof.

Some examples of the method, apparatuses, and non-transitory computer-readable medium described herein may further include operations, features, means, or instructions for determining the second configuration periodicity based on a periodicity relationship with the first configuration periodicity.

In some examples of the method, apparatuses, and non-transitory computer-readable medium described herein, the periodicity relationship may be defined as $T_{RO,2step} = N \times T_{PO,2step}$, where $T_{RO,2step}$ may represent the first configuration periodicity associated with the preamble of the first message, $T_{PO,2step}$ may represent the second configuration periodicity associated with the payload of the first message, and N may represent a configurable integer greater than or equal to one as indicated in the configuration message.

Some examples of the method, apparatuses, and non-transitory computer-readable medium described herein may further include operations, features, means, or instructions for determining the first configuration periodicity based on a periodicity relationship with a periodicity of a first message configuration in a four-step RACH procedure.

In some examples of the method, apparatuses, and non-transitory computer-readable medium described herein, the periodicity relationship may be defined as $T_{RO,2step} = \lambda \times T_{RO,4step}$, where $T_{RO,2step}$ may represent the first configuration periodicity associated with the preamble of the first message, $T_{RO,4step}$ may represent the periodicity of the first message configuration in the four-step RACH procedure, and $\lambda$ may represent a scaling factor, the scaling factor including an integer greater than or equal to one as indicated in the configuration message.

Some examples of the method, apparatuses, and non-transitory computer-readable medium described herein may further include operations, features, means, or instructions for determining a frame for the first configuration periodicity based on a frame relationship with a periodicity of one or more RACH occasions of a four-step RACH procedure.

In some examples of the method, apparatuses, and non-transitory computer-readable medium described herein, the frame relationship may be defined as $(n_{SFN} \bmod T_{RO,2step}) = ((y + \Delta y) \bmod T_{RO,2step})$, where $T_{RO,2step}$ may represent the first configuration periodicity, $n_{SFN}$ may represent a frame number for transmission occasions of the preamble and the payload of the first message of the two-step RACH procedure, y may represent a frame number for the one or more RACH occasions of the four-step RACH procedure, and $\Delta y$ may represent a time offset in frames.

Some examples of the method, apparatuses, and non-transitory computer-readable medium described herein may further include operations, features, means, or instructions for receiving the time offset in the configuration message, an additional configuration message from the base station, an SI transmission, or a combination thereof.

Some examples of the method, apparatuses, and non-transitory computer-readable medium described herein may further include operations, features, means, or instructions for determining a subframe or slot for the first configuration periodicity based on a subframe relationship with a periodicity of one or more RACH occasions of a four-step RACH procedure.

In some examples of the method, apparatuses, and non-transitory computer-readable medium described herein, the subframe relationship may be defined as $(S_n + \Delta s) \bmod L$, where $S_n$ may represent a subframe or slot number containing a RACH occasions of the four-step RACH procedure, $\Delta s$ may represent a time offset in subframes or slots, and L may represent a constant denoting a number of subframes or slots in a frame.

Some examples of the method, apparatuses, and non-transitory computer-readable medium described herein may further include operations, features, means, or instructions for identifying a set of preamble formats, a transmission gap, or a combination thereof, in the configuration message for the two-step RACH procedure, selecting a preamble format from the set of preamble formats for transmission of the preamble of the first message, and transmitting, to the base station, the preamble of the first message with the selected preamble format.

In some examples of the method, apparatuses, and non-transitory computer-readable medium described herein, the preamble and the payload of the first message may be transmitted within a same slot or on different slots based on the selected preamble format, the transmission gap, or a combination thereof.

In some examples of the method, apparatuses, and non-transitory computer-readable medium described herein, the preamble and the payload of the first message may be transmitted within a same bandwidth, partially overlapping bandwidths, or disjoint bandwidths.

A method of wireless communications at a base station is described. The method may include transmitting, to a UE, a configuration message for a two-step RACH procedure, the configuration message including periodical configuration information for transmission of a preamble and transmission of a payload by the UE, the preamble and the payload associated with a first message of the two-step RACH procedure, determining a first configuration periodicity for receiving the preamble and a second configuration periodicity for receiving the payload based on the configuration message, and receiving, from the UE, the preamble of the first message based on the first configuration periodicity and the payload of the first message based on the second configuration periodicity.

An apparatus for wireless communications at a base station is described. The apparatus may include a processor, memory in electronic communication with the processor, and instructions stored in the memory. The instructions may be executable by the processor to cause the apparatus to transmit, to a UE, a configuration message for a two-step RACH procedure, the configuration message including periodical configuration information for transmission of a preamble and transmission of a payload by the UE, the preamble and the payload associated with a first message of the two-step RACH procedure, determine a first configuration periodicity for receiving the preamble and a second configuration periodicity for receiving the payload based on the configuration message, and receive, from the UE, the preamble of the first message based on the first configuration periodicity and the payload of the first message based on the second configuration periodicity.

Another apparatus for wireless communications at a base station is described. The apparatus may include means for transmitting, to a UE, a configuration message for a two-step RACH procedure, the configuration message including periodical configuration information for transmission of a preamble and transmission of a payload by the UE, the preamble and the payload associated with a first message of the two-step RACH procedure, determining a first configuration periodicity for receiving the preamble and a second configuration periodicity for receiving the payload based on the configuration message, and receiving, from the UE, the preamble of the first message based on the first configuration periodicity and the payload of the first message based on the second configuration periodicity.

A non-transitory computer-readable medium storing code for wireless communications at a base station is described. The code may include instructions executable by a processor to transmit, to a UE, a configuration message for a two-step RACH procedure, the configuration message including periodical configuration information for transmission of a preamble and transmission of a payload by the UE, the preamble and the payload associated with a first message of the two-step RACH procedure, determine a first configuration periodicity for receiving the preamble and a second configuration periodicity for receiving the payload based on the configuration message, and receive, from the UE, the preamble of the first message based on the first configuration periodicity and the payload of the first message based on the second configuration periodicity.

In some examples of the method, apparatuses, and non-transitory computer-readable medium described herein, transmitting the configuration message further may include operations, features, means, or instructions for transmitting, to the UE, the configuration message via RRC signaling or via an SI transmission.

Some examples of the method, apparatuses, and non-transitory computer-readable medium described herein may further include operations, features, means, or instructions for transmitting, to the UE, a transmission gap in the configuration message, the transmission gap indicating a time duration between transmission of the preamble and transmission of the payload, and receiving, from the UE, the payload of the first message after the transmission gap.

In some examples of the method, apparatuses, and non-transitory computer-readable medium described herein, receiving the preamble and the payload of the first message further may include operations, features, means, or instructions for receiving, from the UE, the preamble of the first message in at least one RACH occasion, the at least one RACH occasion occurring based on the first configuration periodicity, and receiving, from the UE, the payload of the first message in at least one uplink shared data channel occasion, the at least one uplink shared data channel occasion occurring based on the second configuration periodicity.

In some examples of the method, apparatuses, and non-transitory computer-readable medium described herein, each RACH occasion may be associated with one or more uplink shared data channel occasions.

Some examples of the method, apparatuses, and non-transitory computer-readable medium described herein may further include operations, features, means, or instructions for identifying the one or more uplink shared data channel occasions associated with each RACH occasion based on a preamble sequence grouping.

In some examples of the method, apparatuses, and non-transitory computer-readable medium described herein, the one or more uplink shared data channel occasions include a same MCS, payload size, waveform, or a combination thereof.

Some examples of the method, apparatuses, and non-transitory computer-readable medium described herein may further include operations, features, means, or instructions for determining the second configuration periodicity based on a periodicity relationship with the first configuration periodicity.

In some examples of the method, apparatuses, and non-transitory computer-readable medium described herein, the periodicity relationship may be defined as $T_{RO,2step} = N \times T_{PO,2step}$, where $T_{RO,2step}$ may be the first configuration periodicity associated with the preamble of the first message, $T_{PO,2step}$ may be the second configuration periodicity associated with the payload of the first message, and N may be a configurable integer greater than or equal to one as indicated in the configuration message.

Some examples of the method, apparatuses, and non-transitory computer-readable medium described herein may further include operations, features, means, or instructions for determining the first configuration periodicity based on a periodicity relationship with a periodicity of a first message configuration in a four-step RACH procedure.

In some examples of the method, apparatuses, and non-transitory computer-readable medium described herein, the periodicity relationship may be defined as $T_{RO,2step} = \lambda \times T_{RO,4step}$, where $T_{RO,2step}$ may represent the first configuration periodicity associated with the preamble of the first message, $T_{RO,4step}$ may represent the periodicity of the first message configuration in the four-step RACH procedure, and λ may represent a scaling factor, the scaling factor including an integer greater than or equal to one as indicated in the configuration message.

Some examples of the method, apparatuses, and non-transitory computer-readable medium described herein may further include operations, features, means, or instructions for determining a frame for the first configuration periodicity based on a frame relationship with a periodicity of one or more RACH occasions of a four-step RACH procedure.

In some examples of the method, apparatuses, and non-transitory computer-readable medium described herein, the frame relationship may be defined as $(n_{SFN} \bmod T_{RO,2step}) = ((y+\Delta y) \bmod T_{RO,2step})$, where $T_{RO,2step}$ may represent the first configuration periodicity, $n_{SFN}$ may represent a frame number for transmission occasions of the preamble and the payload of the first message of the two-step RACH procedure, y may represent a frame number for the one or more RACH occasions of the four-step RACH procedure, and $\Delta y$ may represent a time offset in frames.

Some examples of the method, apparatuses, and non-transitory computer-readable medium described herein may further include operations, features, means, or instructions for transmitting the time offset in the configuration message, an additional configuration message, an SI transmission, or a combination thereof.

Some examples of the method, apparatuses, and non-transitory computer-readable medium described herein may further include operations, features, means, or instructions for determining a subframe or slot for the first configuration periodicity based on a subframe relationship with a periodicity of one or more RACH occasions of a four-step RACH procedure.

In some examples of the method, apparatuses, and non-transitory computer-readable medium described herein, the subframe relationship may be defined as $(S_n+\Delta s) \bmod L$, where $S_n$ may represent a subframe or slot number containing a RACH occasions of the four-step RACH procedure, $\Delta s$ may represent a time offset in subframes or slots, and L may represent a constant denoting a number of subframes or slots in a frame.

Some examples of the method, apparatuses, and non-transitory computer-readable medium described herein may further include operations, features, means, or instructions for transmitting, to the UE, a set of preamble formats, a transmission gap, or a combination thereof, in the configuration message for the two-step RACH procedure, and receiving, from the UE, the preamble of the first message with a preamble format from the set of preamble formats.

In some examples of the method, apparatuses, and non-transitory computer-readable medium described herein, the preamble and the payload of the first message may be received within a same slot or on different slots based on the selected preamble format, the transmission gap, or a combination thereof.

In some examples of the method, apparatuses, and non-transitory computer-readable medium described herein, the preamble and the payload of the first message may be received within a same bandwidth, partially overlapping bandwidths, or disjoint bandwidths.

DETAILED DESCRIPTION

Figure 1:
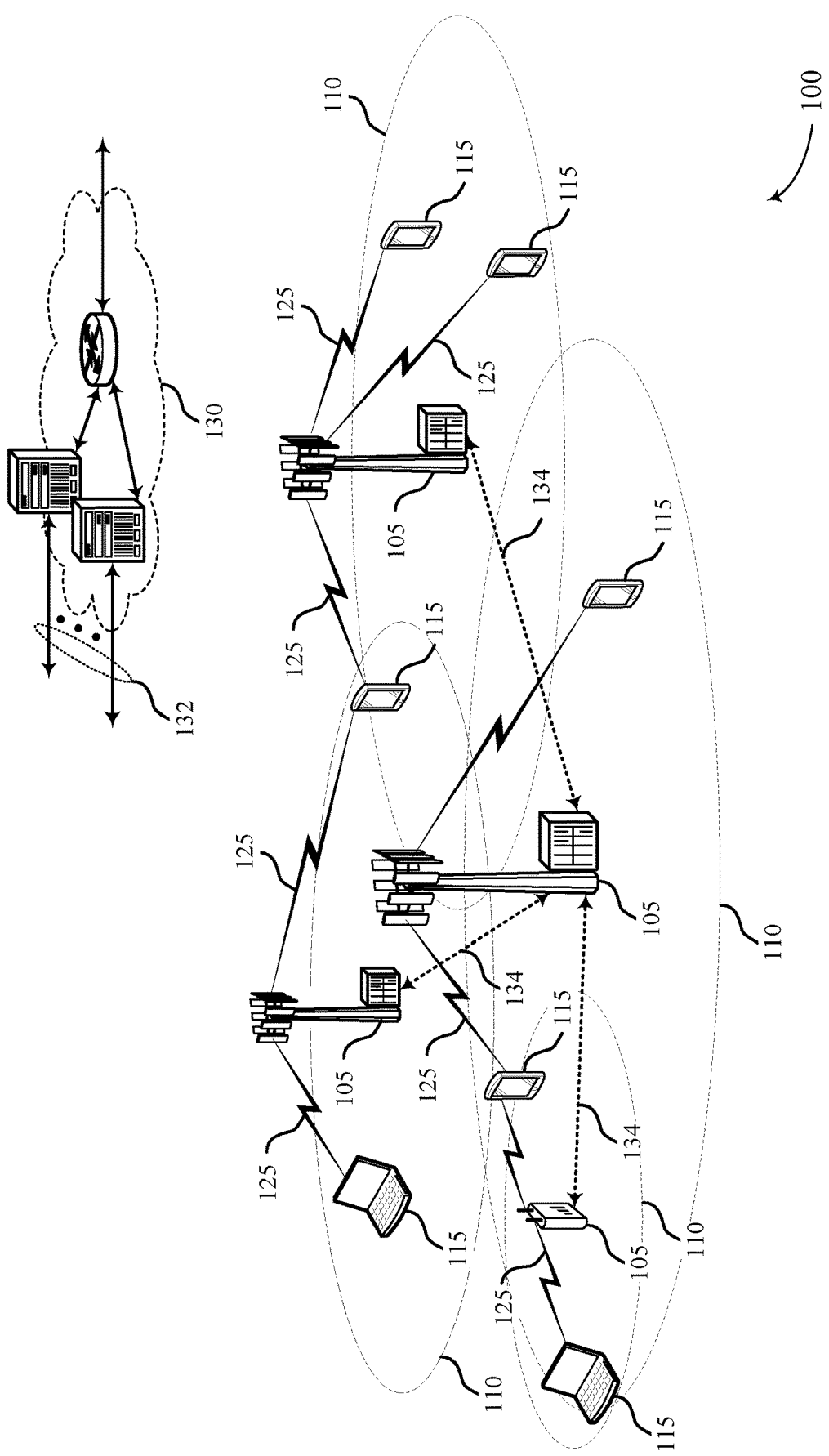
FIG. 1 illustrates an example of a system for wireless communications that supports two-step random access channel (RACH) configuration period in accordance with aspects of the present disclosure.

In some network deployment scenarios, a base station and a user equipment (UE) may simultaneously use different random access procedures to meet different requirements for the system. For example, the different random access procedures may include two-step random access channel (RACH) procedures and four-step RACH procedures, and the different requirements may include capacity limitations, latency requirements, reliability requirements, implementation complexity specifications, etc. Accordingly, different transmission occasions may be defined that can be used for both or either RACH procedure. For example, the different transmission occasions may include RACH occasions and uplink shared channel (e.g., physical uplink shared channel (PUSCH)) occasions. In some cases, a two-step RACH procedure may use RACH occasions separate from a four-step RACH procedure or may share RACH occasions with a four-step RACH procedure but use different sets of preamble sequences.

Accordingly, based on capabilities of the UE and additional factors, the base station may use two-step RACH procedures and four-step RACH procedures in a complementary way, where time and frequency resources (e.g., and code domain resources) may be balanced between each RACH procedure. In some cases, the periodical configuration information may be adaptable for different configuration periods (e.g., periodicities) to achieve a tradeoff between signaling overhead, flexibility, and scalability. For example, the UE may identify periodicities for transmitting different parts of the first message of the two-step RACH procedure based on periodical configuration information transmitted by the base station, where the different parts of the first message include a preamble portion and a payload portion. Accordingly, the UE may transmit the preamble portion during a RACH occasion according to a first configuration periodicity and the payload portion during an uplink shared channel occasion according to a second configuration periodicity. In some cases, the second configuration periodicity may be based on the first configuration periodicity. Additionally, the first configuration periodicity may be based on a periodicity of RACH occasions configured for a four-step RACH procedure (e.g., via a frame relationship, subframe relationship, periodicity relationship, etc.). In some cases, the UE 115 may transmit the preamble and payload portions of the first message in same or different slots and in a same bandwidth, partially overlapping bandwidths, or disjoint bandwidths based on the periodical configuration information. In some cases, the UE 115 may transmit the preamble and payload portions of the first message using bandwidth parts (BWPs). The base station may transmit the periodical configuration information in a system information (SI) transmission or via radio resource control (RRC) signaling.

Aspects of the disclosure are initially described in the context of a wireless communications system. Additionally, aspects of the disclosure may be illustrated by an additional wireless communications system, a transmission occasion configuration, an occasion association, process flow examples, a channel structure, and a transmit chain. Aspects of the disclosure are further illustrated by and described with reference to apparatus diagrams, system diagrams, and flowcharts that relate to two-step RACH configuration period.

FIG. 1 illustrates an example of a wireless communications system 100 that supports two-step RACH configuration period in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a relatively high signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or SI, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth. The UEs 115 and/or base stations 105 may communicate using BWPs corresponding to one or more carriers.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. In some cases, a base station 105 may transmit synchronization signals (e.g., PSS SSS, and the like) using multiple beams in a beam-sweeping manner through a cell coverage area. In some cases, PSS, SSS, and/or broadcast information (e.g., a physical broadcast channel (PBCH)) may be transmitted within different synchronization signal (SS) blocks on respective directional beams, where one or more SS blocks may be included within an SS burst.

After receiving the PSS and SSS, the UE 115 may receive a master information block (MIB), which may be transmitted in the PBCH. The MIB may contain system bandwidth information, an SFN, and a physical HARQ indicator channel (PHICH) configuration. After decoding the MIB, the UE 115 may receive one or more SI blocks (SIBs). For example, SIB1 may contain cell access parameters and scheduling information for other SIBs. Decoding SIB1 may enable the UE 115 to receive SIB2. SIB2 may contain RRC configuration information related to RACH procedures, paging, PUCCH, PUSCH, power control, SRS, and cell barring.

After completing initial cell synchronization, a UE 115 may decode the MIB, SIB1 and SIB2 prior to accessing the network. The MIB may be transmitted on PBCH and may utilize the first 4 OFDMA symbols of the second slot of the first subframe of each radio frame. The MIB may use the middle 6 RBs (72 subcarriers) in the frequency domain. The MIB carries a few important pieces of information for UE initial access, including downlink channel bandwidth in term of RBs, PHICH configuration (duration and resource assignment), and SFN. A new MIB may be broadcast every fourth radio frame (SFN mod 4=0) at and rebroadcast every frame (10 ms). Each repetition is scrambled with a different scrambling code.

After reading an MIB (either a new version or a copy), the UE 115 may try different phases of a scrambling code until getting a successful CRC check. The phase of the scrambling code (0, 1, 2 or 3) may enable the UE 115 to identify which of the four repetitions may be received. Thus, the UE 115 may determine the current SFN by reading the SFN in the decoded transmission and adding the scrambling code phase. After receiving the MIB, a UE 115 may receive one or more SIBs. Different SIBs may be defined according to the type of SI conveyed. A new SIB1 may be transmitted in the fifth subframe of every eighth frame (SFN mod 8=0) and rebroadcast every other frame (20 ms). SIB1 may include access information, including cell identity information, and may indicate whether a UE 115 may camp on a cell. SIB1 may include cell selection information (or cell selection parameters). Additionally, SIB1 may include scheduling information for other SIBs. SIB2 may be scheduled dynamically according to information in SIB1 and may include access information and parameters related to common and shared channels. The periodicity of SIB2 may be set to 8, 16, 32, 64, 128, 256, 512, or any other number of radio frames.

After the UE 115 decodes SIB2, the UE 115 may transmit a RACH preamble (e.g., a message 1 (Msg1) in a four-step RACH procedure) to a base station 105. For example, the RACH preamble may be randomly selected from a set of predetermined sequences (e.g., 64 predetermined sequences). This random selection may enable the base station 105 to distinguish between multiple UEs 115 trying to access the system concurrently. The base station 105 may respond with a random access response (e.g., a second message (Msg2)) that provides an uplink resource grant, a timing advance, a temporary cell radio network temporary identifier (C-RNTI), or a combination thereof. The UE 115 may then transmit an RRC connection request (e.g., a third message (Msg3)) along with a temporary mobile subscriber identity (TMSI) (e.g., if the UE 115 has previously been connected to the same wireless network), or a random identifier. The RRC connection request may also indicate the reason the UE 115 may be connecting to the network (e.g., emergency, signaling, data exchange, etc.). The base station 105 may respond to the connection request with a contention resolution message (e.g., a fourth message (Msg4)) addressed to the UE 115, which may provide a new C-RNTI.

If the UE 115 receives a contention resolution message with the correct identification, the UE 115 may proceed with RRC setup. If the UE 115 does not receive a contention resolution message (e.g., if there is a conflict with another UE 115) the UE 115 may repeat the RACH procedure by transmitting a new RACH preamble. Such exchange of messages between the UE 115 and base station 105 for random access may be referred to as a four-step RACH procedure.

In other examples, a two-step RACH procedure may be performed for random access. For instance, wireless devices operating in licensed or unlicensed spectrum within wireless communications system 100 may initiate a two-step RACH procedure to reduce delay in establishing communication with a base station 105 (e.g., as compared to a four-step RACH procedure). In some cases, the two-step RACH procedure may operate regardless of whether a wireless device (e.g., a UE 115) has a valid timing advance (TA). For example, a UE 115 may use a valid TA to coordinate the timing of its transmissions to a base station 105 (e.g., to account for propagation delay) and may receive the valid TA as part of the two-step RACH procedure. Additionally, the two-step RACH procedure may be applicable to any cell size, may work regardless of whether the RACH procedure is contention-based or contention-free, and may combine multiple RACH messages from a four-step RACH procedure. For example, the two-step RACH procedure may include a first message (e.g., a message A (MsgA)) that combines the Msg1 and Msg3 of the four-step RACH procedure and a second message (e.g., a message B (MsgB)) that combines the Msg2 and Msg4 of the four-step RACH procedure.

The two-step RACH procedure may be applicable to any cell size supported in a wireless communications system, be able to operate regardless of if a UE 115 has a valid timing advance (TA) or not, and may be applied to any RRC state of the UE 115 (e.g., an idle state (RRC_IDLE), an inactive state (RRC_INACTIVE), a connected state (RRC_CONNECTED), etc.). In some cases, the two-step RACH procedure may result in a reduction in signaling overhead and latency, an enhanced RACH capacity, power savings for the UE 115, and provide synergy with other applications (e.g., positioning, mobility enhancement, etc.).

In some network deployment scenarios (e.g., for NR), two-step RACH procedures and four-step RACH procedures may be used simultaneously to meet different requirements for the system. For example, the different requirements may include capacity limitations, latency requirements, reliability requirements, implementation complexity specifications, etc. Accordingly, different transmission occasions may be defined that can be used for both or either RACH procedure. For example, the different transmission occasions may include RACH occasions and uplink shared channel (e.g., PUSCH) occasions. The RACH occasions may include time and frequency resources allocated for physical RACH (PRACH) transmissions. Additionally, up to 64 preamble sequences may be configured for each RACH occasions. In some cases, a two-step RACH procedure may use RACH occasions separate from a four-step RACH procedure or may share RACH occasions with a four-step RACH procedure but use different sets of preamble sequences. Additionally or alternatively, the uplink shared channel occasions (e.g., one or more PUSCH occasions) may include time and frequency resources allocated for MsgA PUSCH transmissions (e.g., and/or for transmissions associated with the four-step RACH procedure).

However, prior to transmitting the MsgA, a UE 115 may not receive downlink control information (DCI) or configuration information from a base station 105 that indicates how or when the UE 115 can transmit the MsgA. Additionally or alternatively, the UE 115 may receive multiple configuration messages for both a two-step RACH procedure and a four-step RACH procedure, thereby increasing a signaling overhead at the UE 115. In some cases, the configuration messages for a two-step RACH procedure may indicate static configuration information, which may cause inefficiencies as loads change within a system and more or less transmissions occur as time goes on. For example, the base station 105 may indicate a fewer number of transmission occasions (e.g., RACH occasions, PUSCH occasions, etc.) for a two-step RACH procedure and/or a four-step RACH procedure based on a higher amount of traffic present at a given time when the configuration information is transmitted to the UE 115 because the time and frequency resources are needed for other transmissions. Subsequently, the amount of traffic may decrease (e.g., freeing up an amount of the previously needed time and frequency resources), but the UE 115 may still use the fewer number of transmission occasions for one or both of the RACH procedures even though a higher number of transmission occasions may be available.

Additionally or alternatively, the base station 105 may indicate a higher number of transmission occasions during low traffic periods, which may then become unavailable if the traffic increases. In some cases, the base station 105 may also configure the transmission occasions (e.g., and periodicities associated with the transmission occasions) based on capabilities of UEs 115 in a coverage area 110 for the base station 105, quality of service (QoS) requirements for the wireless communications, or similar criteria in addition to or alternative to a traffic load. However, as described herein, the configurations for the RACH procedures may be static or include additional signaling to indicate subsequent changes to the static configurations for the RACH procedure. Additionally, the base station 105 may allocate a higher number of transmission occasions (e.g., and time and frequency resources) for four-step RACH procedures than two-step RACH procedures, which may result in fewer opportunities for the UE 115 to perform a two-step RACH procedure. As such, conventional configurations for two-step RACH procedures may be inefficient for the UE 115 to perform a corresponding two-step RACH procedure.

Wireless communications system 100 may include techniques as described herein for a base station 105 to adapt configuration information for transmissions (e.g., MsgA and MsgB) of a two-step RACH procedure. For example, based on UE capabilities, link-level measurements, QoS, and additional factors, the base station 105 may use two-step RACH procedures and four-step RACH procedures in a complementary way, where time and frequency resources (e.g., and code domain resources) may be balanced between each RACH procedure. Additionally, the base station 105 may adapt the configuration information for the two-step RACH procedure based on traffic loads, UE capabilities, and QoS requirements. In some cases, the configuration information may be adaptable for different configuration periods (e.g., periodicities) to achieve a tradeoff between signaling overhead, flexibility, and scalability.

In some cases, the UE 115 may identify periodicities for transmitting different parts of the first message of the two-step RACH procedure (e.g., MsgA) based on the configuration information transmitted by the base station 105, where the different parts include a preamble portion and a payload portion. Accordingly, the UE 115 may transmit the preamble portion during a RACH occasion according to a first configuration periodicity and the payload portion during an uplink shared channel occasion according to a second configuration periodicity. In some cases, the second configuration periodicity may be based on the first configuration periodicity. For example, the second configuration periodicity may be the same, or similar, to the first configuration periodicity. Additionally, the first configuration periodicity may be based on a periodicity of RACH occasions configured for a four-step RACH procedure. In some cases, the UE 115 may transmit the preamble and payload portions of the first message in the same or different slots and in a same bandwidth, partially overlapping bandwidths, or disjoint bandwidths based on the configuration information. In some cases, the UE 115 may transmit the preamble and payload portions of the first message using one or more BWPs. The base station 105 may transmit the configuration information in an SI transmission or via RRC signaling (e.g., if the UE 115 is in a connected state with the base station 105).

Figure 2:
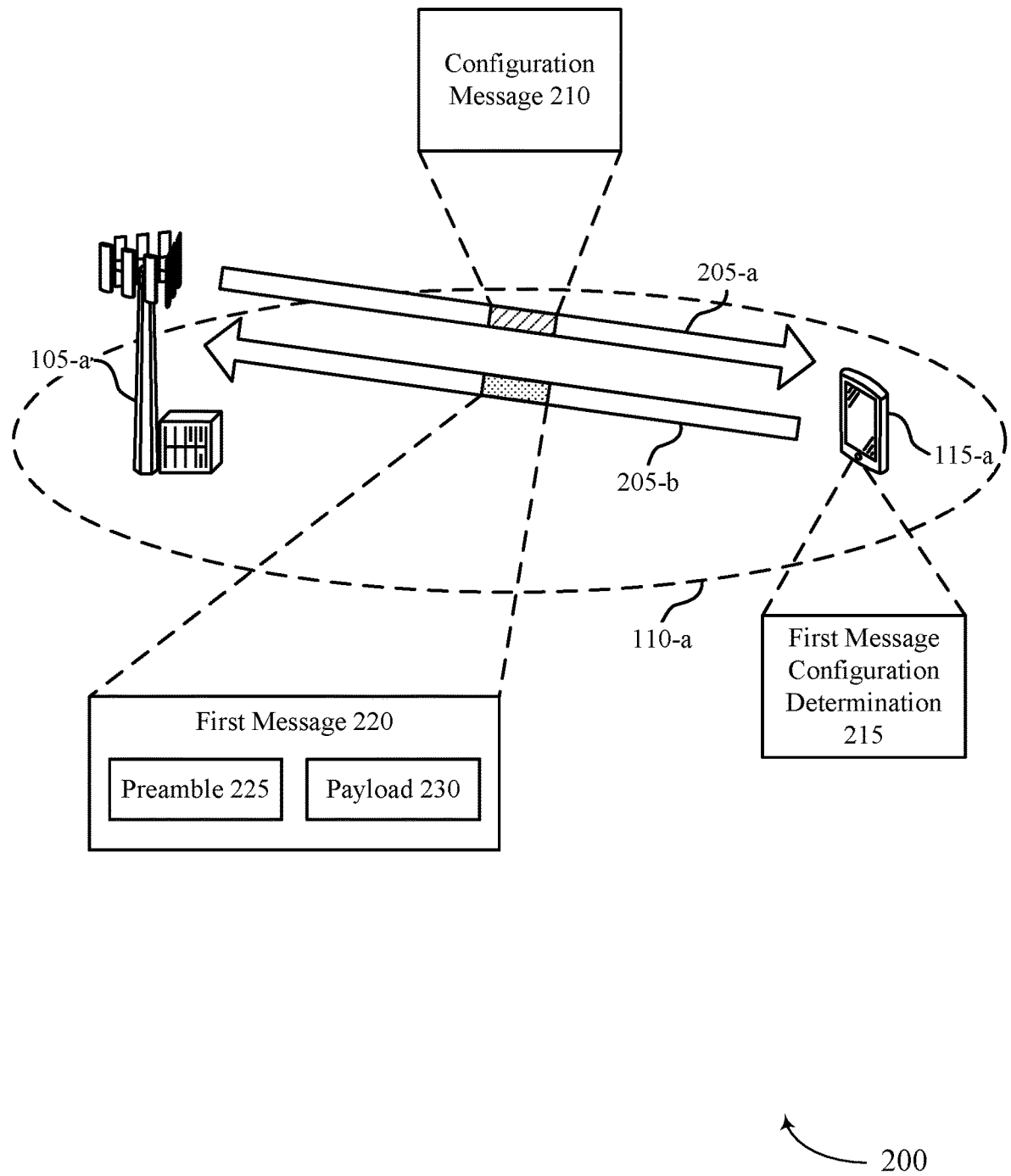
FIG. 2 illustrates an example of a wireless communications system that supports two-step RACH configuration period in accordance with aspects of the present disclosure.

FIG. 2 illustrates an example of a wireless communications system 200 that supports two-step RACH configuration period in accordance with aspects of the present disclosure. In some examples, wireless communications system 200 may implement aspects of wireless communications system 100. Wireless communications system 200 may include a base station 105-a with coverage area 110-a and a UE 115-a, which may be examples of corresponding base stations 105 and UEs 115, respectively, as described herein with reference to FIG. 1. In some cases, UE 115-a may perform a RACH procedure to connect with base station 105-a as part of an initial cell selection, a cell reselection, or a similar access procedure. Accordingly, base station 105-a may transmit downlink messages to UE 115-a on resources of a carrier 205-a, and UE 115-a may transmit uplink messages to base station 105-a on resources of a carrier 205-b. In some cases, carriers 205-a and 205-b may be a same carrier or may be separate carriers. For example, base station 105-a may broadcast the downlink messages on time and frequency resources reserved for broadcasted transmissions, which may be different than resources allocated for uplink messages from UE 115-a or other UEs 115 in the coverage area 110-a of base station 105-a. Additionally or alternatively, UE 115-a may be in a connected state (e.g., RRC_CONNECTED state) with base station 105-a, and downlink messages and uplink messages may be transmitted on a same carrier established previously.

As described herein, UE 115-a may perform a two-step RACH procedure to establish a connection with base station 105-a (e.g., initial connection, reestablishment, etc.). Accordingly, base station 105-a may transmit a configuration message 210 to provide scalable configurations for UE 115-a to transmit different portions of a first message 220 (e.g., MsgA) of the two-step RACH procedure. For example, first message 220 may include a preamble 225 and a payload 230, and configuration message 210 may provide scalable configurations for RACH occasions and PUSCH occasions of two-step RACH procedures (e.g., uplink shared channel occasions) for UE 115-a to transmit preamble 225 and payload 230, respectively (e.g., preamble 225 may be transmitted in a RACH occasion and payload 230 may be transmitted in a PUSCH occasion).

Before transmitting first message 220 with preamble 225 and payload 230, UE 115-a may perform a first message configuration determination 215 based on information received in configuration message 210. Based on first message configuration determination 215, UE 115-a may determine periodicities for the RACH occasions and PUSCH occasions for transmitting the respective portions of first message 220. For example, base station 105-a may configure periodic transmissions for preamble 225 and payload 230 of first message 220 for UE 115-a in RRC states (e.g., idle, inactive, connected, etc.) and transmit these periodic transmission configurations in configuration message 210. In some cases, base station 105-a may transmit configuration message 210 in an SI transmission (e.g., if UE 115-a is not connected to base station 105-a). Additionally or alternatively, if UE 115-a is in a connected state (e.g., RRC_CONNECTED state) with base station 105-a, base station 105-a may transmit configuration message 210 via one, or both, of SI and RRC signaling (e.g., which may provide a higher degree of flexibility in resource allocations). For example, the different opportunities to transmit configuration message 210 may provide more techniques for base station 105-a to indicate resource allocations for transmitting preamble 225 and/or payload 230.

Additionally, UE 115-a may determine time and frequency resources for transmitting preamble 225 and payload 230. In the time domain, UE 115-a may transmit preamble 225 and payload 230 of first message 220 within a same slot (e.g., or different TTI) or on different slots. For example, configuration message 210 may include a set of preamble formats that UE 115-a can use for preamble 225 and a configurable transmission gap that enables whether preamble 225 and payload 230 are transmitted within a same slot or not. Each preamble format or subsets of the preamble formats may correspond to different time and frequency resources, which may indicate when payload 230 may be transmitted after preamble 225. Additionally, the transmission gap may indicate a time duration between transmitting preamble 225 and transmitting payload 230, which may result in payload 230 being transmitted in a separate slot than preamble 225 if the transmission gap is long enough to extend into the separate slot. In the frequency domain, UE 115-a may transmit preamble 225 and payload 230 of first message 220 in a same bandwidth, in partially overlapping bandwidths, or in disjoint bandwidths based on information in configuration message 210. For example, base station 105-a may configure RACH occasions and PUSCH occasion for the respective portions of first message 220 with a same bandwidth or partially overlapping bandwidths.

In some cases, each RACH occasion may be associated with one or multiple PUSCH occasions. For example, one RACH occasion may be associated with multiple PUSCH occasions, where different subsets of RACH preambles in the RACH occasion correspond to one or multiple PUSCH occasions. For example, a first RACH preamble subset may correspond to a first resource set that includes one or more PUSCH occasions, and a second RACH preamble subset may correspond to a second resource set that includes one or more different (e.g., or overlapping) PUSCH occasions. Each PUSCH occasion in a respective resource set may include a same modulation and coding scheme (MCS), payload size, and waveform configuration. Base station 105-a may configure the association between the RACH occasions and the PUSCH occasions based on partitioning in the code domain (e.g., by preamble sequence groupings with the different preamble subsets). Accordingly, base station 105-a may indicate different subsets of preambles may be associated with different PUSCH occasion configurations (e.g., resource sets with same MCS, payload size, and waveform configurations) in configuration message 210.

Additionally, as described herein, UE 115-a may determine periodicities for transmitting preamble 225 and payload 230 based on periodicities of RACH occasions and PUSCH occasions as indicated by configuration message 210 from base station 105-a. In some cases, a configuration period of RACH occasions and PUSCH occasions may be the same or different. For example, base station 105-a may indicate a periodicity relationship between the RACH occasions and PUSCH occasions, given by Equation 1 below.

$$T_{RO,2step} = N \times T_{PO,2step} \quad (1)$$

Where $T_{RO,2step}$ may represent a first configuration periodicity associated with transmission of preamble 225 of first message 220, $T_{PO,2step}$ may represent a second configuration periodicity associated with transmission of payload 230 of first message 220, and N may represent a configurable integer greater than or equal to one as indicated in the configuration message. When N is equal to one, the first configuration periodicity and the second configuration periodicity may be equal, or the same.

In some cases, as described herein with reference to FIG. 1, base station 105-a may configure both two-step RACH procedures and four-step RACH procedures for UEs 115 in a corresponding coverage area for base station 105-a. For example, a subset of the UEs 115 may not support two-step RACH procedures, so base station 105-a may configure four-step RACH procedures for that subset of UEs 115. Additionally or alternatively, base station 105-a may configure the four-step RACH procedure as a back-up for UEs 115 that support the two-step RACH procedure if the two-step RACH procedure fails. Accordingly, given a co-existence of two-step RACH and four-step RACH procedures in wireless communications system 200, RACH occasions for the two-step RACH procedure (e.g., for transmission of preamble 225) may follow rules for periodic transmission based on RACH occasions for four-step RACH procedures. For example, the periodicity of a two-step RACH occasion may be based on a periodicity relationship with a periodicity of a four-step RACH occasion as shown below in Equation 2.

$$T_{RO,2step} = \lambda \times T_{RO,4step} \quad (2)$$

Where $T_{RO,2step}$ may represent a first configuration periodicity associated with RACH occasions for transmission of preamble 225 of first message 220, $T_{RO,4step}$ may represent a periodicity of RACH occasions for transmitting a first message (e.g., Msg1) in the four-step RACH procedure, and λ may represent a scaling factor. In some cases, the scaling factor may be an integer greater than or equal to one as indicated in configuration message 210 from base station 105-a. For example, the scaling factor may be 1, 2, 4, 8, 16, 32, or 64 (e.g., based on the up to 64 preamble sequences that can be configured for each RACH occasion as described herein with reference to FIG. 1).

Additionally or alternatively, UE 115-a may identify a frame containing a RACH occasion dedicated for two-step RACH procedures (e.g., for transmitting preamble 225) based on a frame relationship with a frame for RACH occasions dedicated for four-step RACH procedures. For example, UE 115-a may identify the frame relationship based on Equation 3 below.

$$(n_{SFN} \bmod T_{RO,2step}) = ((y + \Delta y) \bmod T_{RO,2step}) \quad (3)$$

Where $T_{RO,2step}$ may represent a first configuration periodicity of RACH occasions for transmitting preamble 225 of first message 220, $n_{SFN}$ may represent a frame number for transmission occasions (e.g., RACH occasions and PUSCH occasions) for preamble 225 and payload 230 of first message 220 of the two-step RACH procedure, y may represent a frame number for the RACH occasions of the four-step RACH procedure, and Δy may represent a time offset in frames. In some cases, the time offset may take a value in the range of zero (0) to ($T_{RO,2step}$−1). Additionally, base station 105-a (e.g., the network) may configure the time offset and indicate the time offset to UE 115-a via configuration message 210 (e.g., in an SI transmission).

In some cases, UE 115-a may identify a subframe (e.g., or slot) number for a RACH occasion of a two-step RACH occasion configuration based on a subframe relationship with a subframe (e.g., or slot) number containing a RACH occasion for a four-step RACH procedure. For example, UE 115-a may identify the subframe relationship based on Equation 4 below.

$$(S_n + \Delta s) \bmod L \quad (4)$$

Where $S_n$ may represent a subframe (e.g., or slot) number containing a RACH occasion of the four-step RACH procedure, Δs may represent a time offset in subframes (e.g., or slots), and L may represent a constant denoting a number of subframes (e.g., or slots) in a frame. In some cases, the time offset may take a value in a range from zero (0) to (L−1).

Accordingly, base station 105-a may signal a scalable configuration of a RACH occasion period for a two-step RACH procedure in configuration message 210 based on Equations 2, 3, and/or 4. For example, UE 115-a may identify $T_{RO,4step}$, λ, Y, Δy, $S_n$, Δs, L, or a combination thereof based on configuration message 210 from base station 105-a (e.g., via RRC signaling, SI transmissions, etc.) and then determine $T_{RO,2step}$, $n_{SFN}$, and/or a subframe (e.g., or slot) for transmitting preamble 225. In some cases, UE 115-a may then determine $T_{PO,2step}$ based on $T_{RO,2step}$ (e.g., from Equation 2, 3, and/or 4) and N as described above in Equation 1, where N is indicated to UE 115-a in configuration message 210 from base station 105-a. Accordingly, UE 115-a may transmit preamble 225 in a RACH occasion according to $T_{RO,2step}$ and payload 230 in a PUSCH occasion according to $T_{PO,2step}$. In some cases, base station 105-a may configure and transmit the parameters for the four-step RACH procedure (e.g., $T_{RO,4step}$, y, and/or $S_n$) prior to transmitting configuration message 210. After receiving preamble 225 and payload 230 of first message 220, base station 105-a may transmit a second message of the two-step RACH procedure (e.g., MsgB) to UE 115-a, which may complete the two-step RACH procedure (e.g., if correctly received at UE 115-a).

Figure 3:
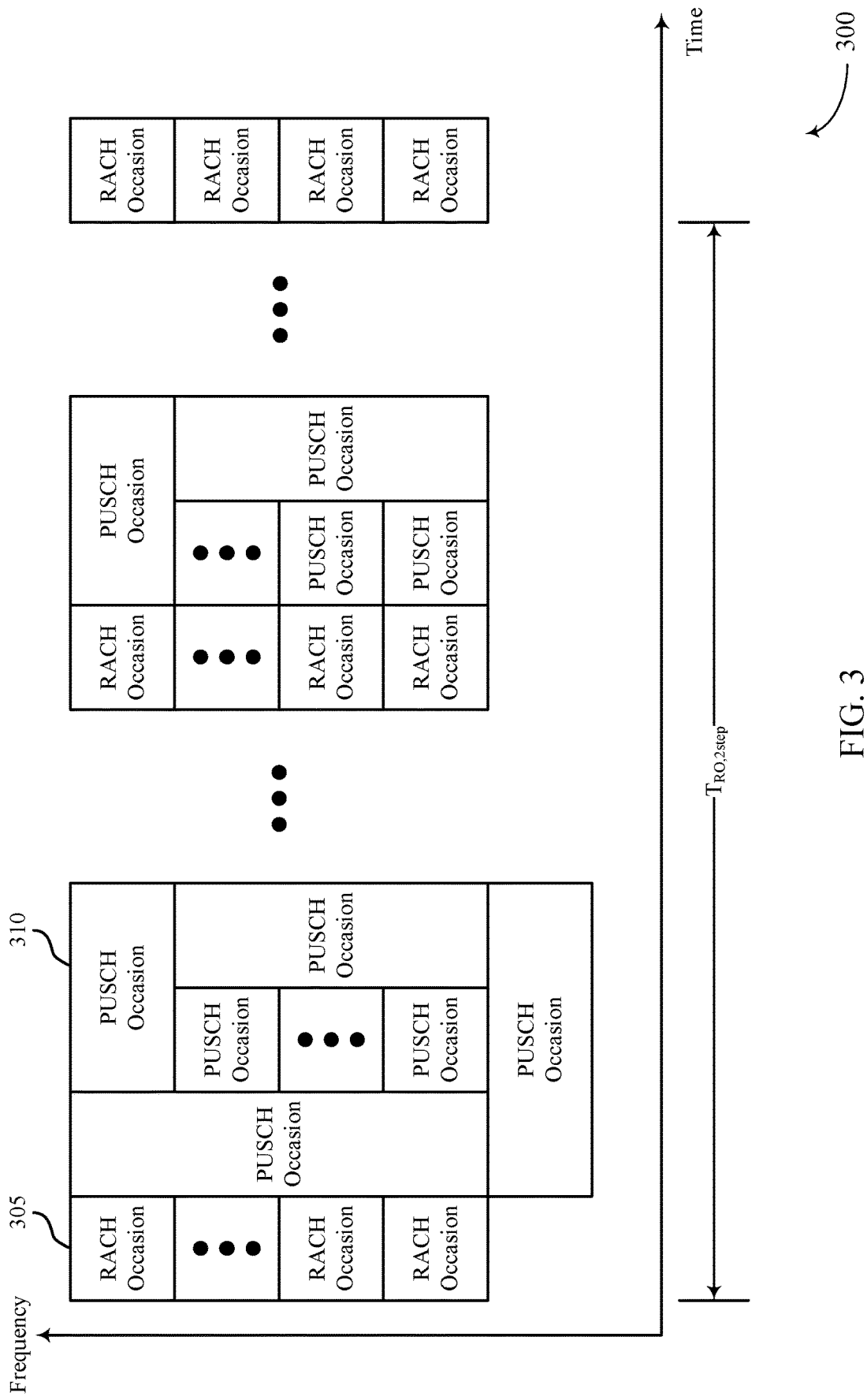
FIG. 3 illustrates an example of a transmission occasion configuration that supports two-step RACH configuration period in accordance with aspects of the present disclosure.

FIG. 3 illustrates an example of a transmission occasion configuration 300 that supports two-step RACH configuration period in accordance with aspects of the present disclosure. In some examples, transmission occasion configuration 300 may implement aspects of wireless communications systems 100 and/or 200. As described herein, a UE 115 and a base station 105 may perform a two-step RACH procedure to establish a connection for subsequent communications. Accordingly, the two-step RACH procedure may include a first message and a second message to establish the connection between the UE 115 and the base station 105, where the UE 115 first transmits the first message and then the base station 105 responds with the second message.

In some cases, the first message may include a preamble and a payload. Accordingly, the UE 115 may transmit the preamble during one or more RACH occasions 305 and may transmit the payload during one or more PUSCH occasions 310. Accordingly, the base station 105 may configure the RACH occasions 305 and PUSCH occasions 310 for a RACH occasion configuration periodicity for a two-step RACH procedure (e.g., $T_{RO,2step}$) and transmit the configuration (e.g., transmission occasion configuration 300) to the UE 115 in a configuration message prior to the UE 115 initiating the two-step RACH procedure. In some cases, each RACH occasion 305 may span a number of consecutive physical RBs (PRBs) (e.g., M consecutive PRBs). Additionally, each RACH occasion 305 may span a same number of PRBs in the frequency domain and span a same number of resources in the time domain (e.g., a same number of symbols, subframes, etc.).

Subsequent to the RACH occasions, the base station 105 may configure the PUSCH occasions 310 to occur. In some cases, each PUSCH occasion 310 may span a same or different number of time and frequency resources (e.g., different sized resource allocations). Additionally, the base station 105 may configure the PUSCH occasions 310 to happen at a periodicity that is the same as or different from $T_{RO,2step}$ for the RACH occasions (e.g., as indicated by Equation 1 described above). For example, the base station 105 may configure the PUSCH occasions 310 to occur every second, third, etc. occurrence of the RACH occasions 305 and indicate this different periodicity for the PUSCH occasions 310 to the UE 115 in the configuration message, as represented by N in Equation 1 as described above. Additionally or alternatively, the base station 105 may configure the PUSCH occasions 310 after each set of RACH occasions 305, but indicate a subset of the PUSCH occasions 310 for the payload transmission of the first message via N in the configuration message.

In some cases, UE 115-a may transmit the preamble and the payload of the first message for the two-step RACH procedure in a same bandwidth, partially overlapping bandwidths, or in disjoint bandwidths, where the base station 105 may transmit an indication of the bandwidths to be used for the preamble and payload transmissions in the configuration message. For example, as shown in transmission occasion configuration 300, the first set of RACH occasions 305 and PUSCH occasions 310 may have partially overlapping bandwidths for the respective transmissions of the first message (e.g., the preamble and payload, respectively), where the PUSCH occasions 310 include a larger bandwidth in the frequency domain than the RACH occasions 305 (e.g., the PUSCH occasions 310 extend farther down in the frequency domain than the RACH occasions 305). Additionally or alternatively, the second set of RACH occasions 305 and PUSCH occasions 310 may include a same bandwidth for the respective transmissions of the first message. Accordingly, the base station 105 may transmit these configurations for each set of RACH occasions 305 and PUSCH occasions 310 in a same configuration message or in separate configuration messages. The UE 115 may then transmit the first message (e.g., including the preamble and the payload) based on the configuration of RACH occasions 305 and the PUSCH occasions 310.

Figure 4:
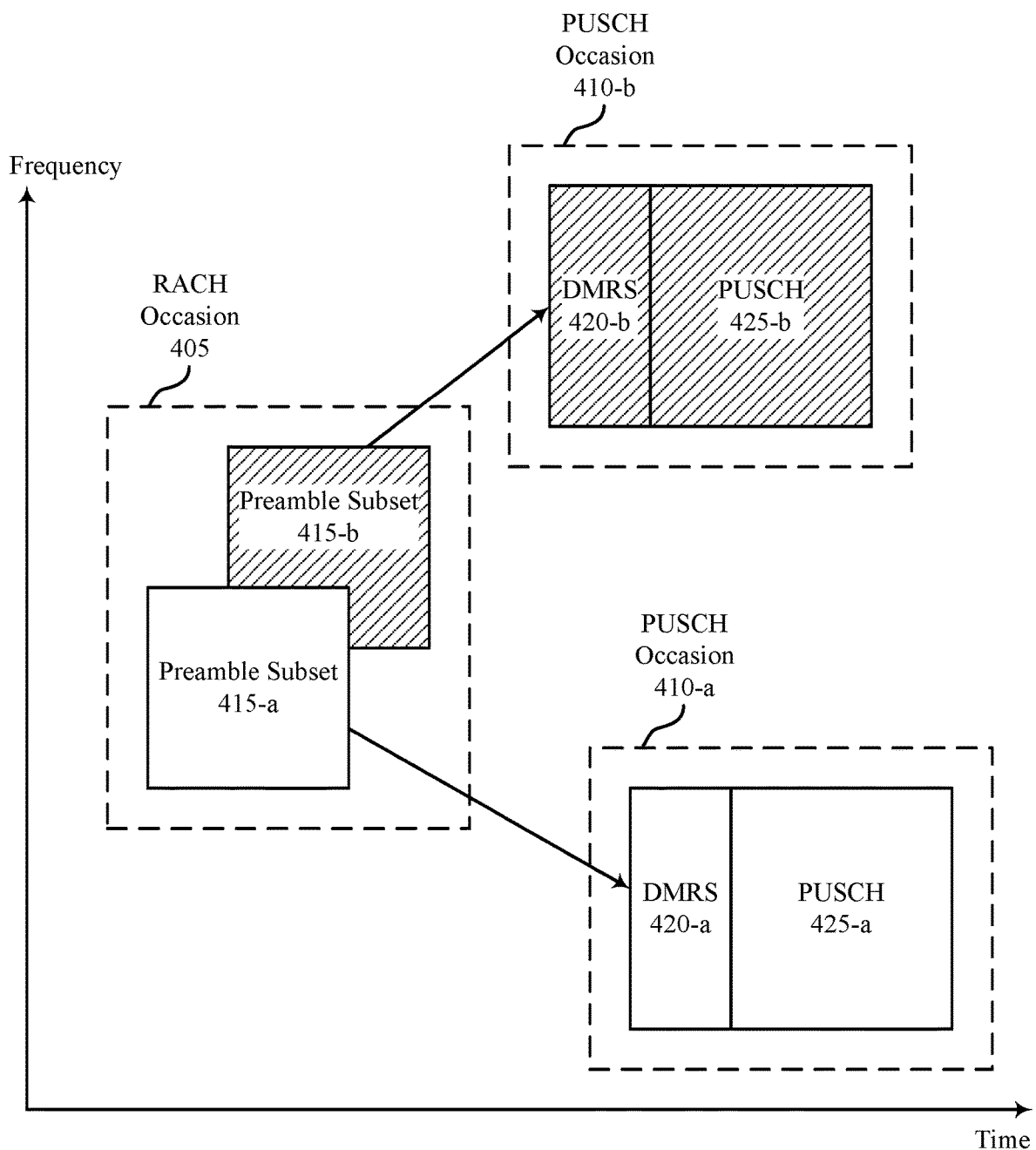
FIG. 4 illustrates an example of an occasion association that supports two-step RACH configuration period in accordance with aspects of the present disclosure.

FIG. 4 illustrates an example of an occasion association 400 that supports two-step RACH configuration period in accordance with aspects of the present disclosure. In some examples, occasion association 400 may implement aspects of wireless communications systems 100 and/or 200. As described herein, a UE 115 and a base station 105 may perform a two-step RACH procedure to establish a connection for subsequent communications, where the UE 115 transmits a first message of the two-step RACH procedure and the first message includes a preamble and a payload. Accordingly, the UE 115 may transmit the preamble during one or more RACH occasions 405 and may transmit the payload during one or more PUSCH occasions 410 based on a configuration of the occasions as described herein with reference to FIGS. 2 and 3.

Each RACH occasion 405 may be associated with one or multiple PUSCH occasions 410. For example, RACH occasion 405 may be associated with a first PUSCH occasion 410-a and a second PUSCH occasion 410-b. Accordingly, the base station 105 may configure the associations between RACH occasion 405 and the PUSCH occasions 410 by partitioning RACH occasion 405 in a code domain. That is, the base station 105 may group different preamble subsets 415 within RACH occasion, where the different preamble subsets 415 correspond to different PUSCH occasions 410. For example, a first preamble subset 415-a may be associated with first PUSCH occasion 410-a, and a second preamble subset 415-b may be associated with second PUSCH occasion 410-b.

In some cases, rather than being associated with single PUSCH occasions 410, each preamble subset 415 may be associated with different PUSCH occasion configurations. For example, each PUSCH occasion 410 as shown may include multiple PUSCH occasions, where each PUSCH occasion includes a same configuration. The same configuration may include a same MCS, payload size, waveform, or a combination thereof for the payload transmission. For example, any PUSCH occasions within first PUSCH occasion 410-a may include a same first configuration (e.g., and associated parameters), while any PUSCH occasions within second PUSCH occasion 410-b may include a same second configuration. In some cases, the different configurations may include one or more of the same parameters but may be configured to different time and frequency resource sets (e.g., first PUSCH occasion 410-a may be located in a first resource set and second PUSCH occasion 410-b may be located in a second resource set).

Additionally, each PUSCH occasion 410 may include a demodulation reference signal (DMRS) portion 420 and a PUSCH portion 425 (e.g., first PUSCH occasion 410-a may include DMRS portion 420-a and PUSCH portion 425-a and second PUSCH occasion 410-b may include DMRS portion 420-b and PUSCH portion 425-b). The DMRS portion 420 of each PUSCH occasion 410 may include reference signals that enable the base station 105 to receive and decode the payload of the first message correctly, and the PUSCH portion 425 may include the payload transmission of the first message (e.g., and any additional uplink communications from the UE 115). In some cases, the base station 105 may transmit an indication of the associations between a RACH occasion 405 and the one or more PUSCH occasions 410 in a configuration message to the UE 115 prior to the UE 115 transmitting the first message of the two-step RACH procedure.

Figure 5:
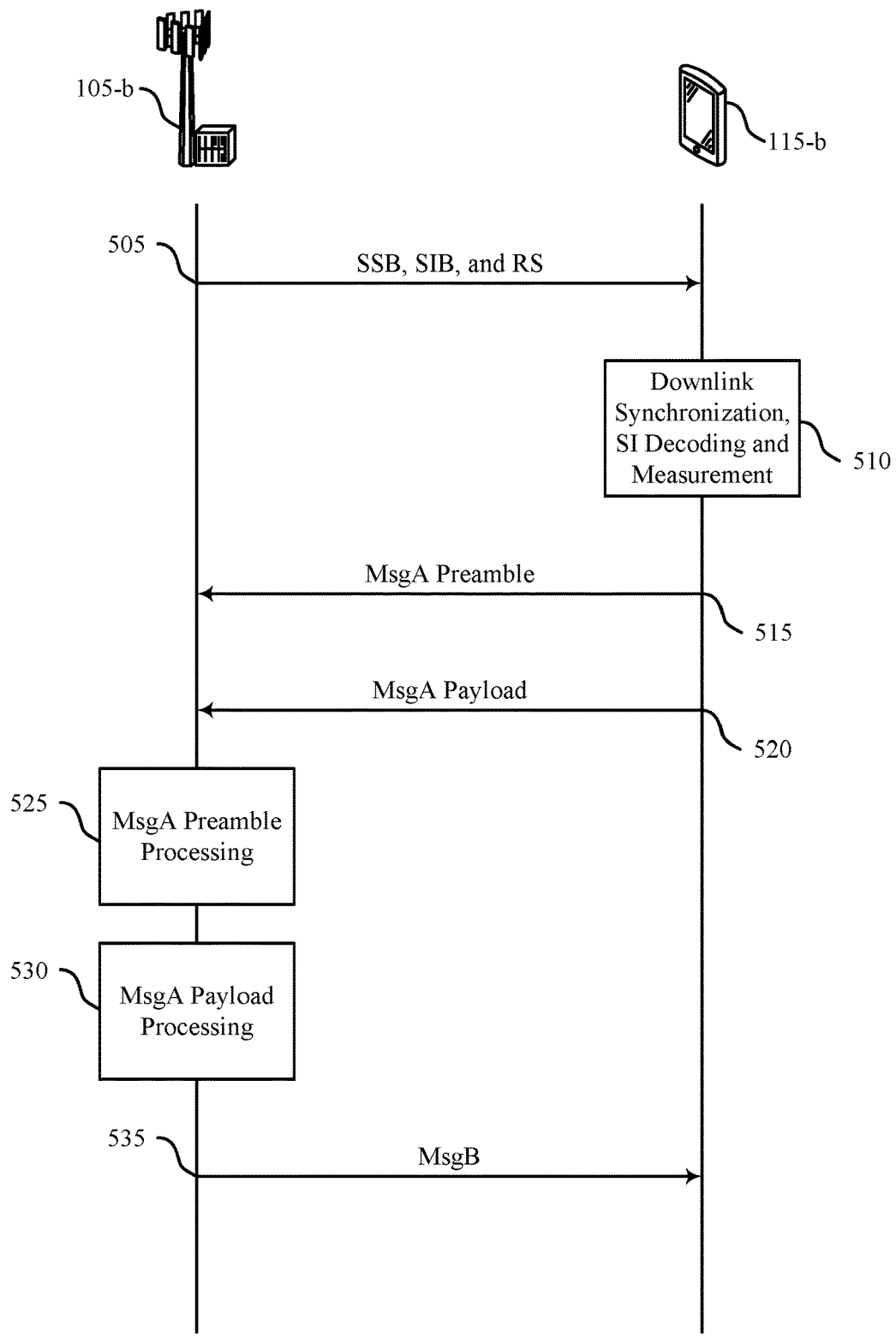
FIG. 5 illustrates an example of a process flow that supports two-step RACH configuration period in accordance with aspects of the present disclosure.

FIG. 5 illustrates an example of a process flow 500 that supports two-step RACH configuration period in accordance with aspects of the present disclosure. In some examples, process flow 500 may implement aspects of wireless communications systems 100 and/or 200. Process flow 500 may include a base station 105-b and a UE 115-b, which may be examples of corresponding base stations 105 and UEs 115, respectively, as described herein with reference to FIGS. 1 through 4. Additionally, process flow 500 may illustrate a two-step RACH procedure as described herein for UE 115-a to establish a connection with base station 105-b for subsequent communications.

At 505, base station 105-a may transmit a synchronization signal block (SSB), SIB, reference signal, or a combination thereof to indicate configuration information to UE 115-b for performing the two-step RACH procedure. At 510, UE 115-b may perform a downlink synchronization based on the received SSB to synchronize with base station 105-b prior to beginning the two-step RACH procedure. Additionally, UE 115-*b* may decode and measure any SI transmissions received from base station 105-*b* (e.g., an SIB, a reference signal, etc.) to identify configuration information for transmitting a first message of the two-step RACH procedure. For example, by decoding and measuring the SI, UE 115-*b* may identify a periodicity for transmitting different portions of the first message.

At 515, UE 115-*b* may transmit, to base station 105-*b*, a preamble of the first message (e.g., MsgA preamble) of the two-step RACH procedure. As described herein, UE 115-*b* may transmit the preamble in one or more RACH occasions configured to carry the preamble by base station 105-*b*. Additionally, at 520, UE 115-*b* may transmit, to base station 105-*b*, a payload of the first message (e.g., MsgA payload), where the payload may be transmitted in one or more PUSCH occasions associated with the RACH occasion as described herein.

At 525, base station 105-*b* may process the preamble of the first message. Accordingly, if the preamble is detected and intended for base station 105-*b* from UE 115-*b*, at 530, base station 105-*b* may then process the payload of the first message.

Based on correctly receiving and processing both portions of the first message, at 535, base station 105-*b* may then transmit a second message (e.g., MsgB) of the two-step RACH procedure to UE 115-*b*. Subsequently, if UE 115-*b* correctly receives the second message (e.g., with no interference or is able to decode the message with any interference), the two-step RACH procedure may be complete, and UE 115-*b* and base station 105-*b* may communicate based on the successful RACH procedure.

Figure 6A:
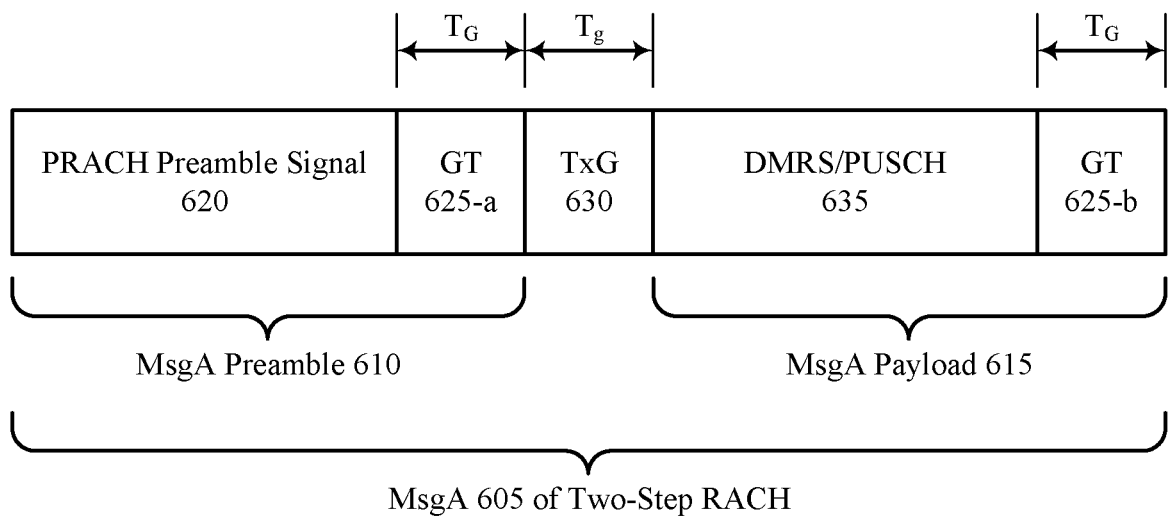
FIG. 6A illustrates an example of a channel structure that supports two-step RACH configuration period in accordance with aspects of the present disclosure.

FIG. 6A illustrates an example of a channel structure 600 that supports two-step RACH configuration period in accordance with aspects of the present disclosure. In some examples, channel structure 600 may implement aspects of wireless communications systems 100 and/or 200. In some cases, channel structure 600 may represent the structure of a first message (e.g., MsgA) 605 for a two-step RACH procedure as described herein. Accordingly, in some cases, a UE 115 may transmit first message 605 to a base station 105 according to the channel structure 600. The channel structure 600 of the first message 605 may support a contention-based random access (CBRA) (e.g., RACH) procedure on shared time-frequency-code resources In some cases, first message 605 may include a preamble 610 and a payload 615 as described herein, where transmission bandwidths for the preamble 610 and the payload 615 may be the same or different (e.g., as described herein with reference to FIGS. 3 and 4). The preamble 610 may include a PRACH preamble signal 620, where the preamble 610 (e.g., with PRACH preamble signal 620) serves multiple purposes. For example, the preamble 610 may facilitate timing offset estimation by the base station 105. Additionally, the preamble 610 may supply an early indication of MCS, payload size, and resource allocation for the payload 615, which may provide a more efficient solution than an uplink control information (UCI) piggyback on a PUSCH that includes the payload. In some cases, the resource allocation for the payload 615 may be based on a pre-defined mapping rule between the preamble 610 and the payload 615. The payload 615 may include a DMRS/PUSCH 635 portion for transmission of the payload of the first message 605, where the payload 615 may include a configurable payload size for different use cases and RRC states. For example, the payload 615 may include a minimum payload size (e.g., of 56/72 bits) and may not include a maximum (e.g., upper bound) payload size. In some cases, the payload 615 may include 1000 bits of small data from a user plane (UP) and/or control plane (CP).

Additionally, between each portion of first message 605 (e.g., between preamble 610 and payload 615), a guard time (GT) 625 may exist. For example, the base station 105 may configure the GT 625 to mitigate inter symbol interference (ISI) and/or inter carrier interference (ICI) for asynchronous uplink communications. In some cases, GT 625 may be referenced as a guard band (GB). A first GT 525-*a* may exist between preamble 610 and payload 615, and a second GT 525-*b* may exist after payload 615 and a subsequent preamble 610. Additionally, the base station 105 may also configure a transmission gap (e.g., TxG) 630 to extend the time between preamble 610 and payload 615. The transmission gap 630 may extend the first message 605 to occur over more than one symbol (e.g., or different TTI length). In some cases, each GT 625 may have a duration equal to $T_G$, and the transmission gap 630 may have a duration equal to $T_g$.

Figure 6B:
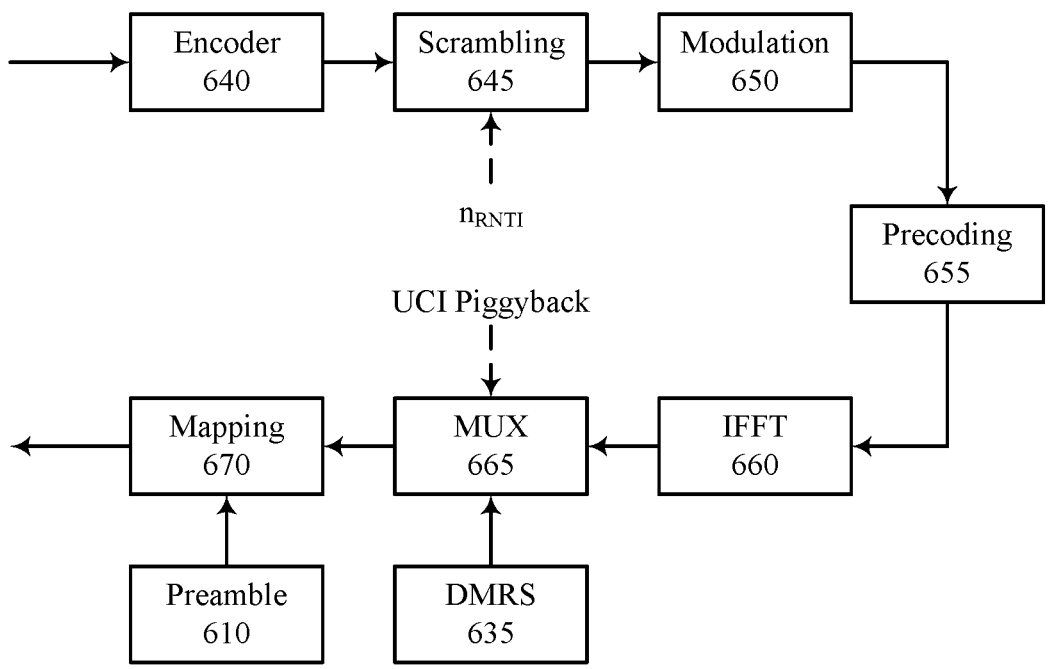
FIG. 6B illustrates an example of a transmit chain that supports two-step RACH configuration period in accordance with aspects of the present disclosure.

FIG. 6B illustrates an example of a transmit chain 601 that supports two-step RACH configuration period in accordance with aspects of the present disclosure. In some examples, transmit chain 601 may implement aspects of wireless communications systems 100 and/or 200. Transmit chain 601 may illustrate how a first message of a two-step RACH procedure (e.g., MsgA) is configured (e.g., encoded, scrambled, mapped, etc.) by a UE 115 prior to the UE 115 transmitting the first message.

The UE 115 may use an encoder 640 for encoding a payload portion of the first message. In some cases, the encoder 640 may be a low-density parity check (LDPC) encoder. After encoding the payload, the UE 115 may pass the payload through a scrambling 645, which may scramble the encoded bits. In some cases, the UE 115 may initialize the scrambling 645 by a modified RNTI (e.g., $n_{RNTI}$). Additionally, the scrambling 645 may include a unified bit scrambling scheme for all RRC states of the UE 115 (e.g., connected, idle, inactive, etc.) based on Equation 5 as given below.

$$n_{RNTI} \triangleq \lfloor RA\text{-}RNTI + K_1 \times p_{id} + K_2 \times r_{id} \rfloor_{16} \quad (5)$$

Where $p_{id}$ may represent an index of the preamble of the first message, $r_{id}$ may represent an index of a DMRS of the first message, and $K_1$ and $K_2$ may represent constants for signaling. Additionally, the scrambling 645 may include an initialization based on $n_{RNTI}$ as given below in Equation 6.

$$c_{init} = n_{RNTI} \times 2^{15} + n_{ID} \quad (6)$$

After scrambling the encoded bits, the UE 115 may then use a modulation 650. In some cases, the modulation 650 may include a linear modulation. Subsequently, the UE 115 may perform a precoding 655 (e.g., transform precoding) on the modulated bits. The UE 115 may then use an inverse fast Fourier transform (IFFT) 660 after precoding to transform the bits. After the IFFT 660, the UE 115 may use a multiplexer (MUX) 665. In some cases, with the MUX 665, the UE 115 may use a DMRS 635 (e.g., similar to the DMRS/PUSCH 635 as described herein with reference to FIG. 6A) to determine the multiplexing. Additionally, the UE 115 may piggyback UCI on the bits while using the MUX 665. Subsequently, the UE 115 may perform a mapping 670. In some cases, the UE 115 may perform the mapping as indicated in the preamble 610 (e.g., as referenced by the preamble 610 in FIG. 6A). For example, the preamble 610 may indicate a pre-defined mapping rule between a preamble and the payload of the first message.

The UE 115 may then transmit the first message after performing the different steps.

Figure 7:
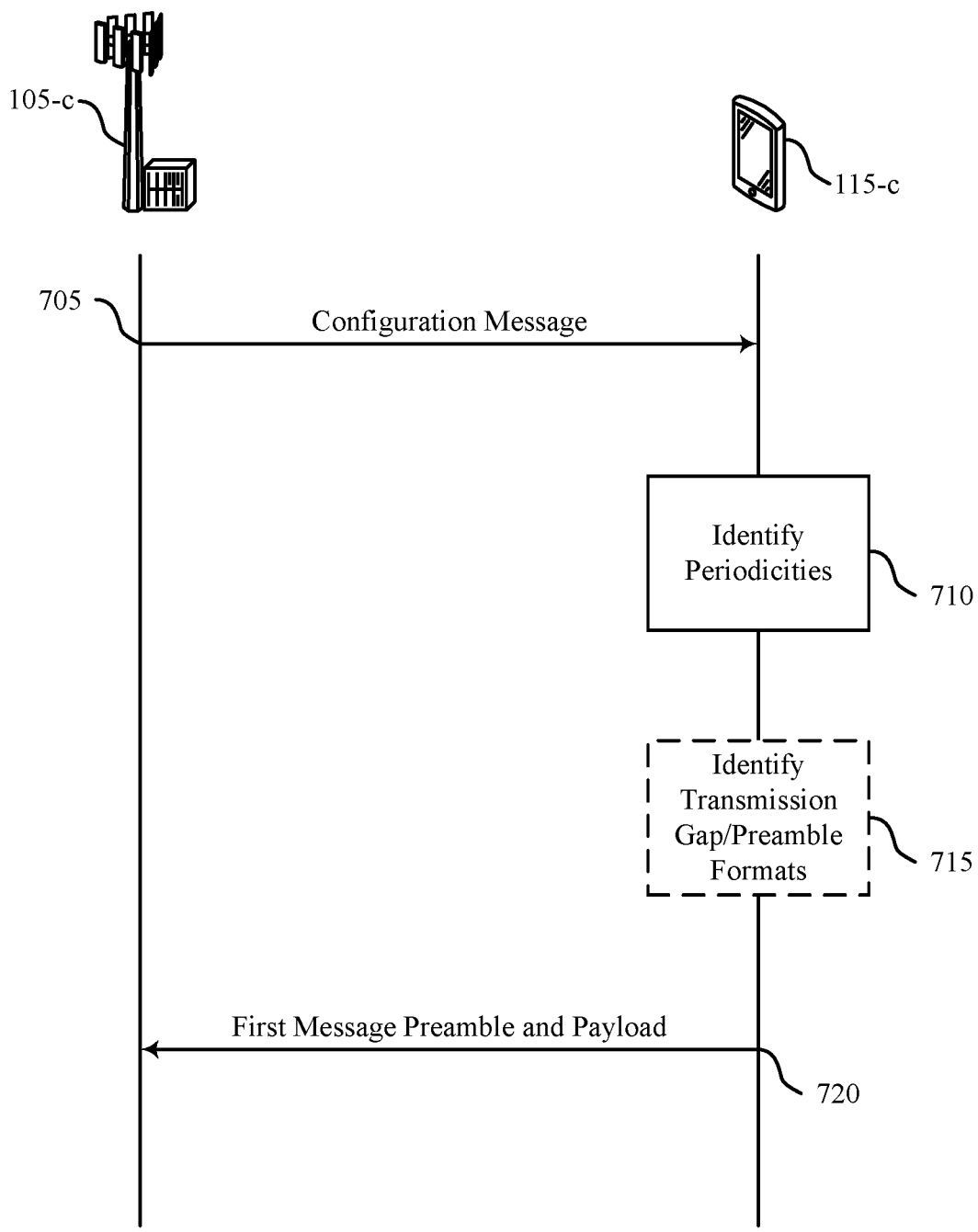
FIG. 7 illustrates an example of a process flow that supports two-step RACH configuration period in accordance with aspects of the present disclosure.

FIG. 7 illustrates an example of a process flow 700 that supports two-step RACH configuration period in accordance with aspects of the present disclosure. In some examples, process flow 700 may implement aspects of wireless communications systems 100 and/or 200. Process flow 700 may include a base station 105-*c* and a UE 115-*c*, which may be examples of corresponding base stations 105 and UEs 115, respectively, as described herein with reference to FIGS. 1 through 6.

In the following description of the process flow 700, the operations between UE 115-*c* and base station 105-*c* may be transmitted in a different order than the order shown, or the operations performed by base station 105-*c* and UE 115-*c* may be performed in different orders or at different times. Certain operations may also be left out of the process flow 700, or other operations may be added to the process flow 700. It is to be understood that while base station 105-*c* and UE 115-*c* are shown performing a number of the operations of process flow 700, any wireless device may perform the operations shown.

At 705, UE 115-*c*, may receive, from base station 105-*c*, a configuration message for a two-step RACH procedure, the configuration message including configuration information for transmission of a preamble and transmission of a payload, the preamble and the payload associated with a first message of the two-step RACH procedure (e.g., MsgA). In some cases, the UE 115-*c* may receive the configuration message via RRC signaling or via an SI transmission.

At 710, UE 115-*c* may identify a first configuration periodicity for transmitting the preamble and a second configuration periodicity for transmitting the payload based on the configuration message. In some cases, UE 115-*c* may determine the second configuration periodicity based on a periodicity relationship with the first configuration periodicity, where the periodicity relationship may be defined by Equation 1 as described above with reference to FIG. 2. Additionally or alternatively, UE 115-*c* may determine the first configuration periodicity based on a separate periodicity relationship with a periodicity of a first message configuration in a four-step RACH procedure, where the separate periodicity relationship may be defined by Equation 2 as described above with reference to FIG. 2.

In some cases, UE 115-*c* may determine a frame for the first configuration periodicity based on a frame relationship with a periodicity of one or more RACH occasions of a four-step RACH procedure, where the frame relationship may be defined by Equation 3 as described above with reference to FIG. 2. Accordingly, UE 115-*c* may receive the time offset for Equation 3 in the configuration message at 705, in an additional configuration message from base station 105-*c*, an SI transmission, or a combination thereof. Additionally or alternatively, UE 115-*c* may determine a subframe or slot for the first configuration periodicity based on a subframe relationship with a periodicity of one or more RACH occasions of a four-step RACH procedure, where the subframe relationship may be defined by Equation 4 as described herein with reference to FIG. 2. In some cases, base station 105-*c* may perform similar calculations as UE 115-*c* to identify the first configuration periodicity and the second configuration periodicity.

At 715, UE 115-*c* may identify a transmission gap in the configuration message, the transmission gap indicating a time duration between transmission of the preamble and transmission of the payload. Additionally or alternatively, UE 115-*c* may identify a set of preamble formats, a transmission gap, or a combination thereof, in the configuration message for the two-step RACH procedure. Accordingly, UE 115-*c* may select a preamble format from the set of preamble formats for transmission of the preamble of the first message.

At 720, UE 115-*c* may transmit, to base station 105-*c*, the preamble of the first message based on the first configuration periodicity and the payload of the first message based on the second configuration periodicity. In some cases, UE 115-*c* may transmit the preamble of the first message with the selected preamble format and/or may transmit the payload of the first message after the identified transmission gap. Additionally, the preamble and the payload of the first message may be transmitted within a same slot or on different slots based on the selected preamble format, the transmission gap, or a combination thereof. In some cases, the preamble and the payload of the first message also may be transmitted within a same bandwidth, partially overlapping bandwidths, or disjoint bandwidths.

In some implementations, UE 115-*c* may transmit, to base station 105-*c*, the preamble of the first message in at least one RACH occasion, the at least one RACH occasion occurring based on the first configuration periodicity, and may transmit, to base station 105-*c*, the payload of the first message in at least one uplink shared data channel occasion (e.g., a PUSCH occasion), the at least one uplink shared data channel occasion occurring based on the second configuration periodicity. Additionally, in some cases, each RACH occasion may be associated with one or more uplink shared data channel occasions. Accordingly, UE 115-*c* may identify the one or more uplink shared data channel occasions associated with each RACH occasion based on a preamble sequence grouping, where the one or more uplink shared data channel occasions include a same MCS, payload size, waveform, or a combination thereof.

Figure 8:
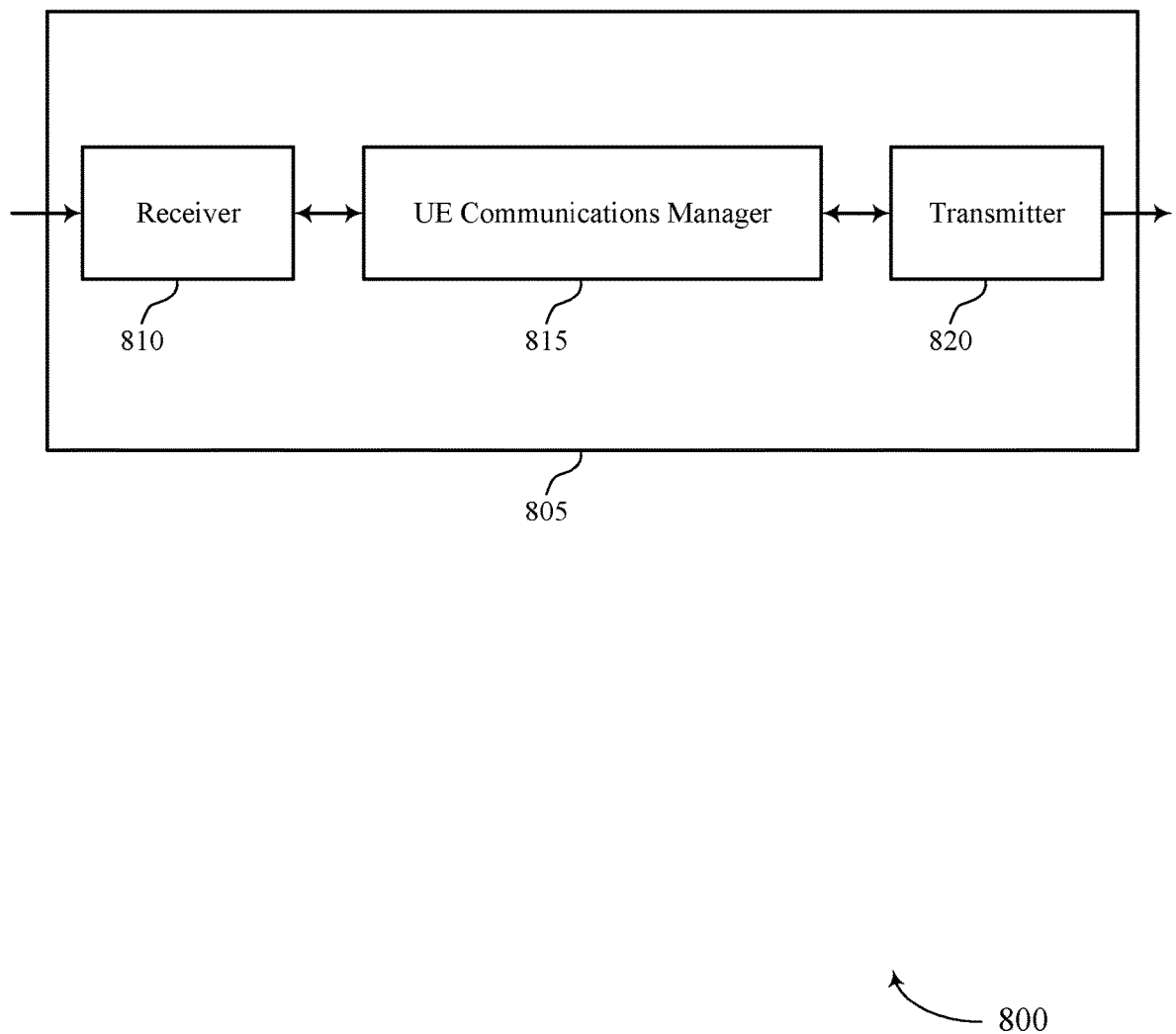
FIGS. 8 and 9 show block diagrams of devices that support two-step RACH configuration period in accordance with aspects of the present disclosure.

FIG. 8 shows a block diagram 800 of a device 805 that supports two-step RACH configuration period in accordance with aspects of the present disclosure. The device 805 may be an example of aspects of a UE 115 as described herein. The device 805 may include a receiver 810, a UE communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to two-step RACH configuration period, etc.). Information may be passed on to other components of the device 805. The receiver 810 may be an example of aspects of the transceiver 1120 described with reference to FIG. 11. The receiver 810 may utilize a single antenna or a set of antennas.

The UE communications manager 815 may receive, from a base station, a configuration message for a two-step RACH procedure, the configuration message including periodical configuration information for transmission of a preamble and transmission of a payload, the preamble and the payload associated with a first message of the two-step RACH procedure. In some cases, the UE communications manager 815 may identify a first configuration periodicity for transmitting the preamble and a second configuration periodicity for transmitting the payload based on the configuration message. Accordingly, the UE communications manager 815 may transmit, to the base station, the preamble of the first message based on the first configuration periodicity and the payload of the first message based on the second configuration periodicity. The UE communications manager 815 may be an example of aspects of the UE communications manager 1110 described herein.

The actions performed by the communications manager 815 as described herein may be implemented to realize one or more potential advantages. One implementation may enable a UE to identify periodicities for transmitting a preamble and payload for a first message of a two-step RACH procedure based on a message from the base station. Such techniques may reduce signaling overhead between the base station and a UE, which may result in higher data rates and more efficient communications (e.g., reduced latency), among other advantages.

Based on implementing the techniques as described herein, a processor of a UE or base station (e.g., a processor controlling the receiver 810, the communications manager 815, the transmitter 820, or a combination thereof) may reduce signaling overhead in a communications system, while ensuring relatively efficient communications. For example, the two-step RACH procedure techniques described herein may leverage a configuration message to identify different periodicities, which may realize improved spectral efficiency and power savings, among other benefits.

The UE communications manager 815, or its sub-components, may be implemented in hardware, code (e.g., software or firmware) executed by a processor, or any combination thereof. If implemented in code executed by a processor, the functions of the UE communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 815, or its sub-components, may be physically located at various positions, including being distributed such that portions of functions are implemented at different physical locations by one or more physical components. In some examples, the UE communications manager 815, or its sub-components, may be a separate and distinct component in accordance with various aspects of the present disclosure. In some examples, the UE communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
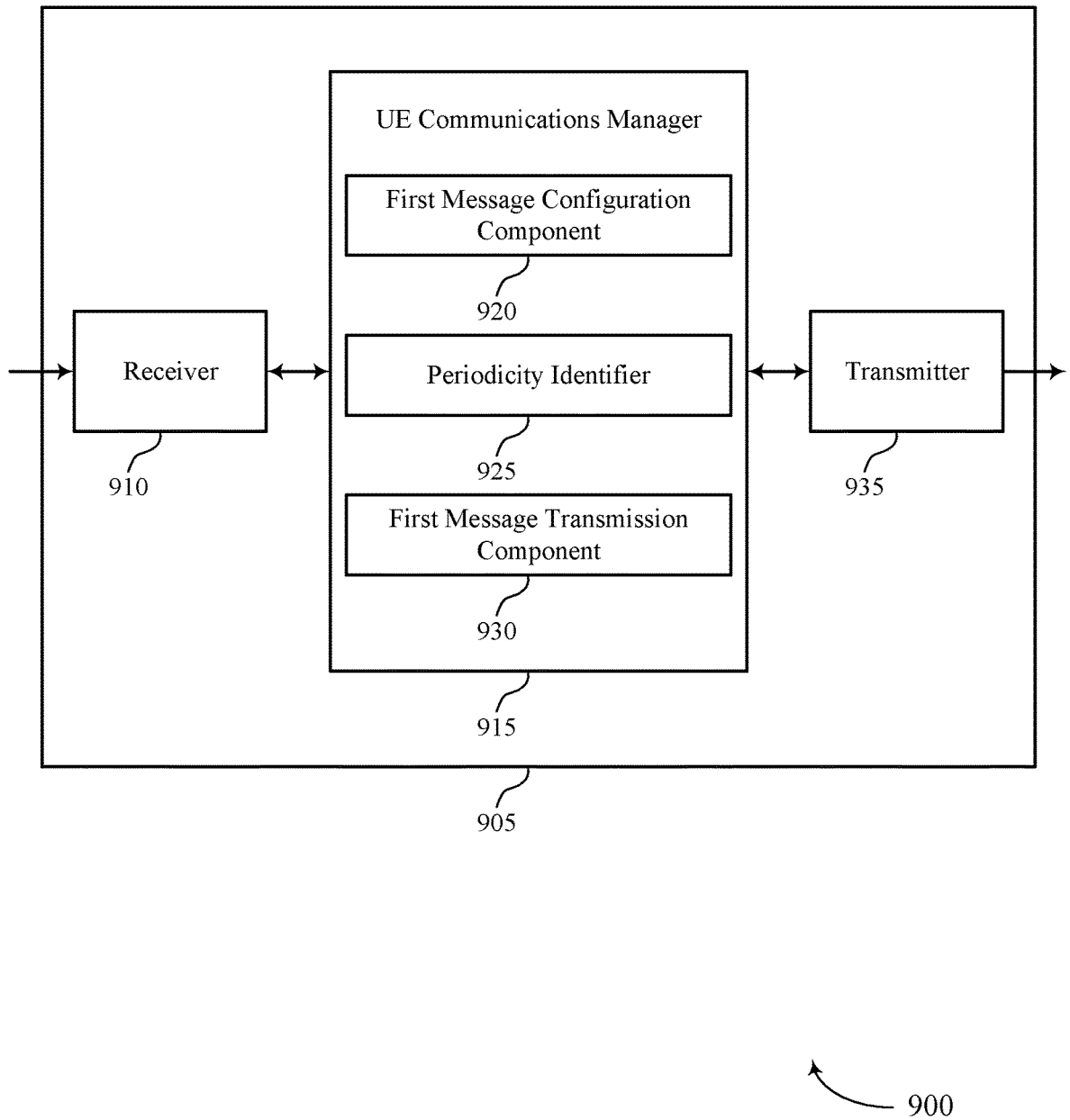

FIG. 9 shows a block diagram 900 of a device 905 that supports two-step RACH configuration period in accordance with aspects of the present disclosure. The device 905 may be an example of aspects of a device 805, or a UE 115 as described herein. The device 905 may include a receiver 910, a UE communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to two-step RACH configuration period, etc.). Information may be passed on to other components of the device 905. The receiver 910 may be an example of aspects of the transceiver 1120 described with reference to FIG. 11. The receiver 910 may utilize a single antenna or a set of antennas.

The UE communications manager 915 may be an example of aspects of the UE communications manager 815 as described herein. The UE communications manager 915 may include a first message configuration component 920, a periodicity identifier 925, and a first message transmission component 930. The UE communications manager 915 may be an example of aspects of the UE communications manager 1110 described herein.

The first message configuration component 920 may receive, from a base station, a configuration message for a two-step RACH procedure, the configuration message including periodical configuration information for transmission of a preamble and transmission of a payload, the preamble and the payload associated with a first message of the two-step RACH procedure.

The periodicity identifier 925 may identify a first configuration periodicity for transmitting the preamble and a second configuration periodicity for transmitting the payload based on the configuration message.

The first message transmission component 930 may transmit, to the base station, the preamble of the first message based on the first configuration periodicity and the payload of the first message based on the second configuration periodicity.

Based on receiving the configuration message, a processor of a UE 115 (e.g., controlling the receiver 910, the transmitter 940, or a transceiver 1120 as described with reference to FIG. 11) may efficiently prepare a preamble and payload of a first message of a two-step RACH procedure prior to transmitting each of the preamble and the payload. For example, the processor of the UE 115 may identify when corresponding RACH occasions and PUSCH occasions are forthcoming for transmitting the preamble and the payload, respectively, and have the corresponding transmissions ready prior to the corresponding occasions. Accordingly, the processor may transmit the different parts of the first message as soon as the occasions occur, thereby utilizing time and frequency resources configured for each transmission more efficiently.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
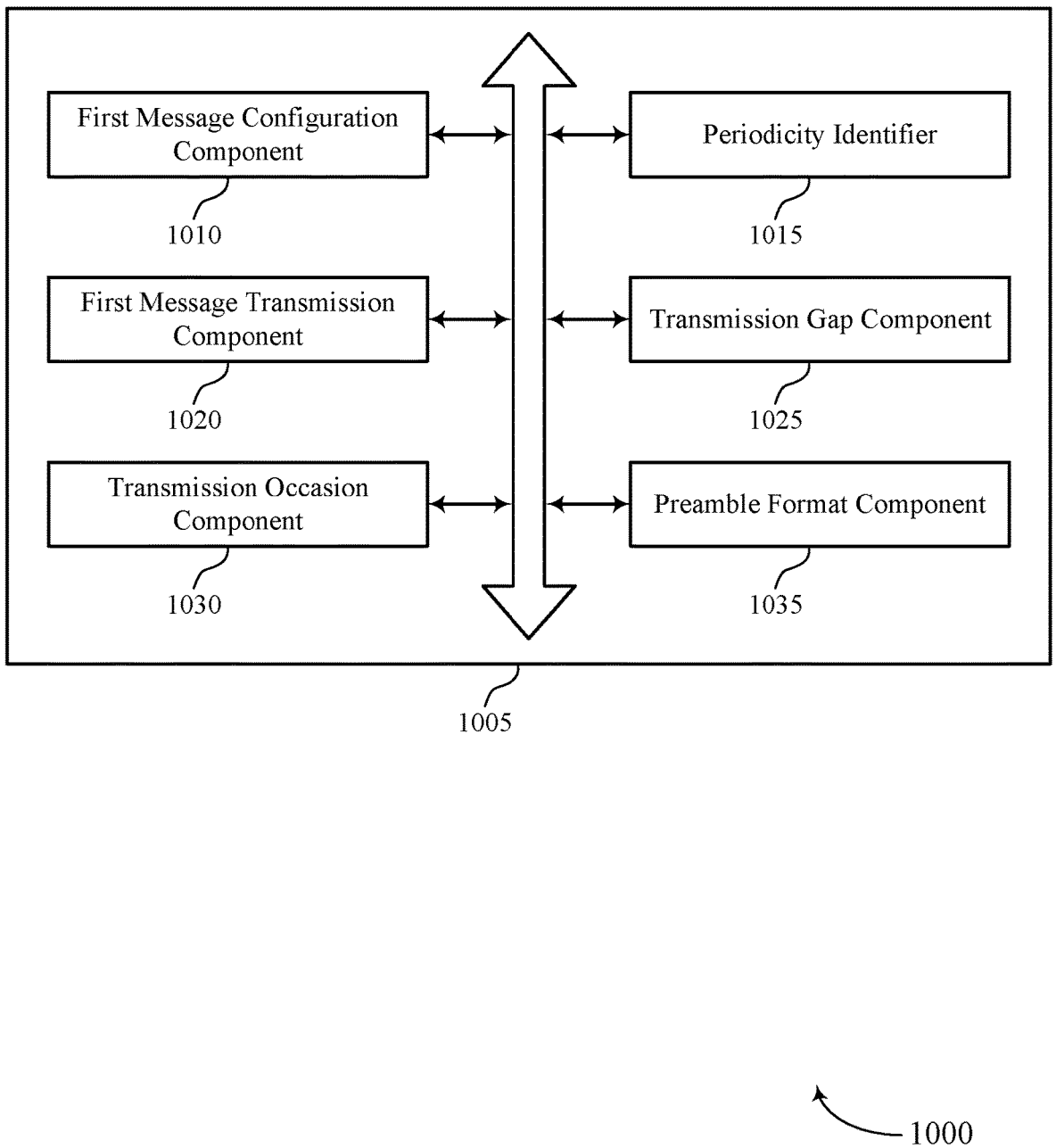
FIG. 10 shows a block diagram of a UE communications manager that supports two-step RACH configuration period in accordance with aspects of the present disclosure.

FIG. 10 shows a block diagram 1000 of a UE communications manager 1005 that supports two-step RACH configuration period in accordance with aspects of the present disclosure. The UE communications manager 1005 may be an example of aspects of a UE communications manager 815, a UE communications manager 915, or a UE communications manager 1110 described herein. The UE communications manager 1005 may include a first message configuration component 1010, a periodicity identifier 1015, a first message transmission component 1020, a transmission gap component 1025, a transmission occasion component 1030, and a preamble format component 1035. Each of these modules may communicate, directly or indirectly, with one another (e.g., via one or more buses).

The first message configuration component 1010 may receive, from a base station, a configuration message for a two-step RACH procedure, the configuration message including periodical configuration information for transmission of a preamble and transmission of a payload, the preamble and the payload associated with a first message of the two-step RACH procedure. In some examples, the first message configuration component 1010 may receive, from the base station, the configuration message via RRC signaling or via an SI transmission.

The periodicity identifier 1015 may identify a first configuration periodicity for transmitting the preamble and a second configuration periodicity for transmitting the payload based on the configuration message. In some examples, the periodicity identifier 1015 may determine the second configuration periodicity based on a periodicity relationship with the first configuration periodicity. For example, the periodicity relationship may be defined as $T_{RO,2step} = N \times T_{PO,2step}$) where $T_{RO,2step}$ may be the first configuration periodicity associated with the preamble of the first message, $T_{PO,2step}$ may be the second configuration periodicity associated with the payload of the first message, and N may be a configurable integer greater than or equal to one as indicated in the configuration message.

Additionally or alternatively, the periodicity identifier 1015 may determine the first configuration periodicity based on a periodicity relationship with a periodicity of a first message configuration in a four-step RACH procedure. For example, the periodicity relationship may be defined as $T_{RO,2step} = \lambda \times T_{RO,4step}$, where $T_{RO,2step}$ may be the first configuration periodicity associated with the preamble of the first message, $T_{RO,4step}$ may be the periodicity of the first message configuration in the four-step RACH procedure, and $\lambda$ may be a scaling factor, the scaling factor including an integer greater than or equal to one as indicated in the configuration message.

In some cases, the periodicity identifier 1015 may determine a frame for the first configuration periodicity based on a frame relationship with a periodicity of one or more RACH occasions of a four-step RACH procedure. For example, the frame relationship may be defined as $(n_{SFN} \bmod T_{RO,2step}) = ((y + \Delta y) \bmod T_{RO,2step})$, where $T_{RO,2step}$ may be the first configuration periodicity, $n_{SFN}$ may be a frame number for transmission occasions of the preamble and the payload of the first message of the two-step RACH procedure, y may be a frame number for the one or more RACH occasions of the four-step RACH procedure, and $\Delta y$ may be a time offset in frames. In some examples, the periodicity identifier 1015 may receive $\Delta y$ in the configuration message, an additional configuration message from the base station, an SI transmission, or a combination thereof.

Additionally or alternatively, the periodicity identifier 1015 may determine a subframe or slot for the first configuration periodicity based on a subframe relationship with a periodicity of one or more RACH occasions of a four-step RACH procedure. For example, the subframe relationship may be defined as $(S_n + \Delta s) \bmod L$, where $S_n$ may be a subframe or slot number containing a RACH occasions of the four-step RACH procedure, $\Delta s$ may be a time offset in subframes or slots, and L may be a constant denoting a number of subframes or slots in a frame.

The first message transmission component 1020 may transmit, to the base station, the preamble of the first message based on the first configuration periodicity and the payload of the first message based on the second configuration periodicity. In some cases, the preamble and the payload of the first message may be transmitted within a same bandwidth, partially overlapping bandwidths, or disjoint bandwidths.

The transmission gap component 1025 may identify a transmission gap in the configuration message, the transmission gap indicating a time duration between transmission of the preamble and transmission of the payload. In some examples, the transmission gap component 1025 may transmit, to the base station, the payload of the first message after the identified transmission gap.

The transmission occasion component 1030 may transmit, to the base station, the preamble of the first message in at least one RACH occasion, the at least one RACH occasion occurring based on the first configuration periodicity. Additionally, the transmission occasion component 1030 may transmit, to the base station, the payload of the first message in at least one uplink shared data channel occasion, the at least one uplink shared data channel occasion occurring based on the second configuration periodicity. In some examples, the transmission occasion component 1030 may identify the one or more uplink shared data channel occasions associated with each RACH occasion based on a preamble sequence grouping. In some cases, each RACH occasion may be associated with one or more uplink shared data channel occasions. Additionally, the one or more uplink shared data channel occasions include a same MCS, payload size, waveform, or a combination thereof.

The preamble format component 1035 may identify a set of preamble formats, a transmission gap, or a combination thereof, in the configuration message for the two-step RACH procedure. In some examples, the preamble format component 1035 may select a preamble format from the set of preamble formats for transmission of the preamble of the first message and may transmit, to the base station, the preamble of the first message with the selected preamble format. In some cases, the preamble and the payload of the first message may be transmitted within a same slot or on different slots based on the selected preamble format, the transmission gap, or a combination thereof.

Figure 11:
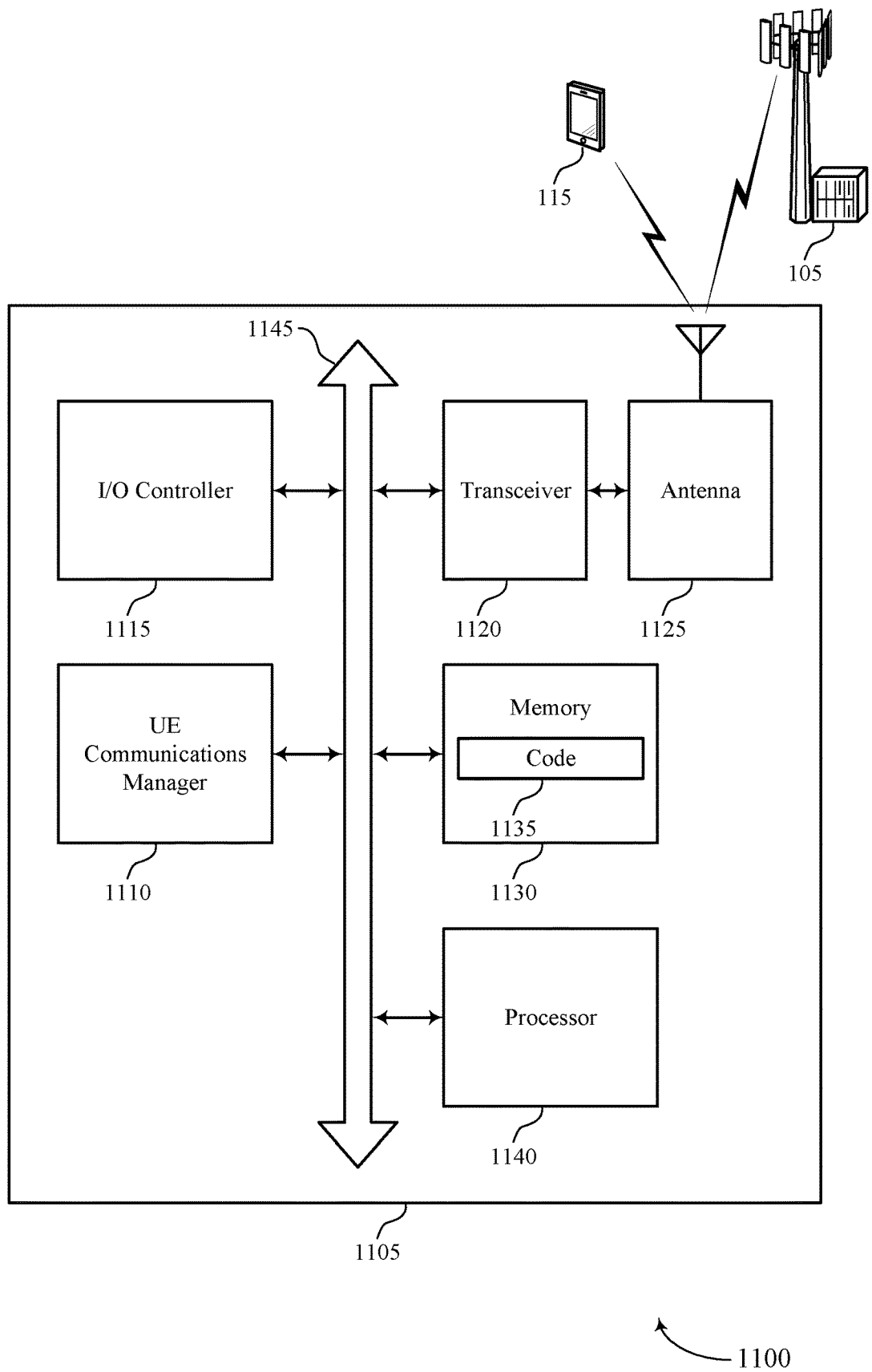
FIG. 11 shows a diagram of a system including a device that supports two-step RACH configuration period in accordance with aspects of the present disclosure.

FIG. 11 shows a diagram of a system 1100 including a device 1105 that supports two-step RACH configuration period in accordance with aspects of the present disclosure. The device 1105 may be an example of or include the components of device 805, device 905, or a UE 115 as described herein. The device 1105 may include components for bi-directional voice and data communications including components for transmitting and receiving communications, including a UE communications manager 1110, an I/O controller 1115, a transceiver 1120, an antenna 1125, memory 1130, and a processor 1140. These components may be in electronic communication via one or more buses (e.g., bus 1145).

The UE communications manager 1110 may receive, from a base station, a configuration message for a two-step RACH procedure, the configuration message including periodical configuration information for transmission of a preamble and transmission of a payload, the preamble and the payload associated with a first message of the two-step RACH procedure. In some cases, the UE communications manager 1110 may identify a first configuration periodicity for transmitting the preamble and a second configuration periodicity for transmitting the payload based on the configuration message. Accordingly, the UE communications manager 1110 may transmit, to the base station, the preamble of the first message based on the first configuration periodicity and the payload of the first message based on the second configuration periodicity.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touch-screen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting two-step RACH configuration period).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
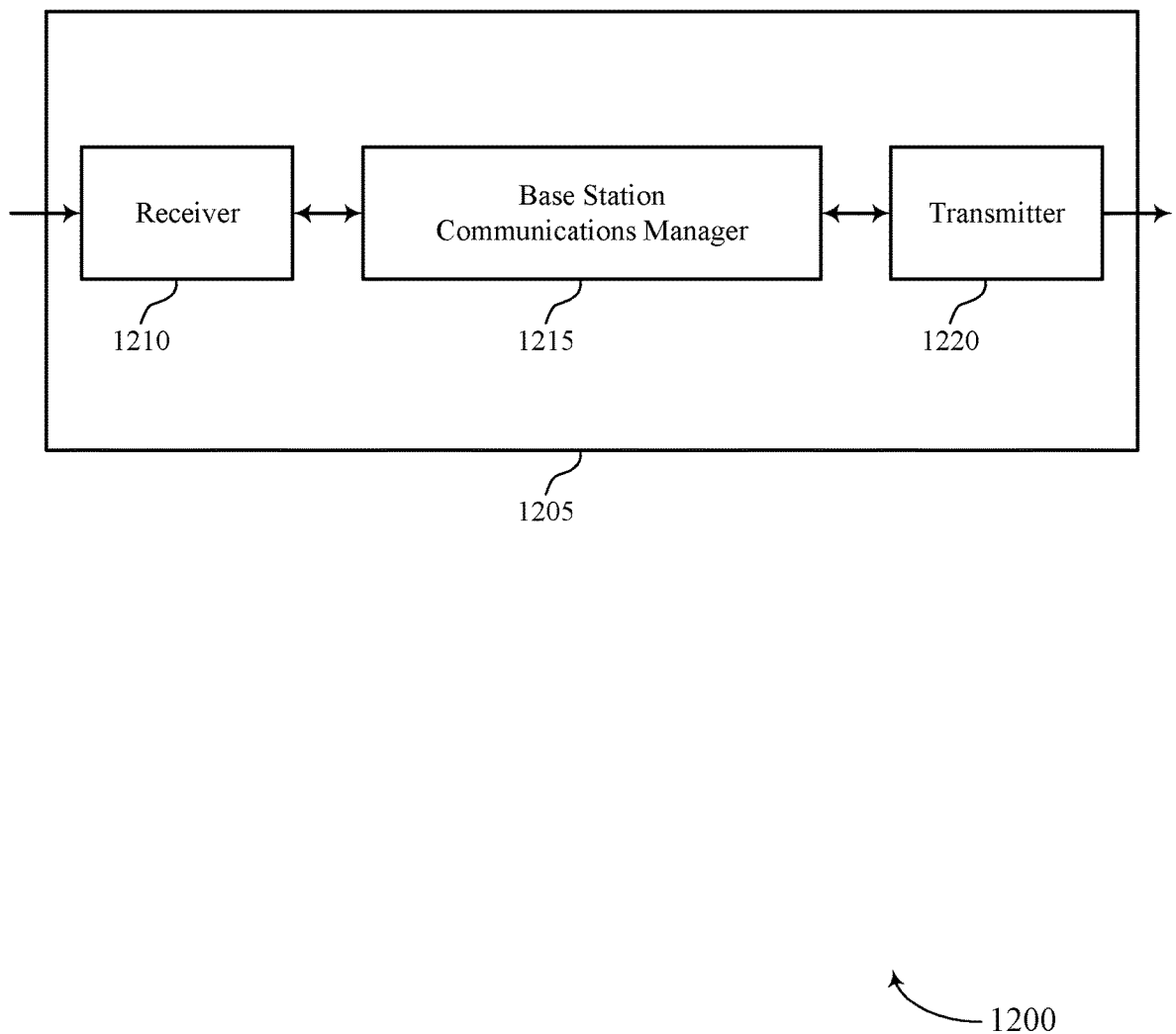
FIGS. 12 and 13 show block diagrams of devices that support two-step RACH configuration period in accordance with aspects of the present disclosure.

FIG. 12 shows a block diagram 1200 of a device 1205 that supports two-step RACH configuration period in accordance with aspects of the present disclosure. The device 1205 may be an example of aspects of a base station 105 as described herein. The device 1205 may include a receiver 1210, a base station communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to two-step RACH configuration period, etc.). Information may be passed on to other components of the device 1205. The receiver 1210 may be an example of aspects of the transceiver 1520 described with reference to FIG. 15. The receiver 1210 may utilize a single antenna or a set of antennas.

The base station communications manager 1215 may transmit, to a UE, a configuration message for a two-step RACH procedure, the configuration message including periodical configuration information for transmission of a preamble and transmission of a payload by the UE, the preamble and the payload associated with a first message of the two-step RACH procedure. In some cases, the base station communications manager 1215 may determine a first configuration periodicity for receiving the preamble and a second configuration periodicity for receiving the payload based on the configuration message. Accordingly, the base station communications manager 1215 may receive, from the UE, the preamble of the first message based on the first configuration periodicity and the payload of the first message based on the second configuration periodicity. The base station communications manager 1215 may be an example of aspects of the base station communications manager 1510 described herein.

The base station communications manager 1215, or its sub-components, may be implemented in hardware, code (e.g., software or firmware) executed by a processor, or any combination thereof. If implemented in code executed by a processor, the functions of the base station communications manager 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1215, or its sub-components, may be physically located at various positions, including being distributed such that portions of functions are implemented at different physical locations by one or more physical components. In some examples, the base station communications manager 1215, or its sub-components, may be a separate and distinct component in accordance with various aspects of the present disclosure. In some examples, the base station communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
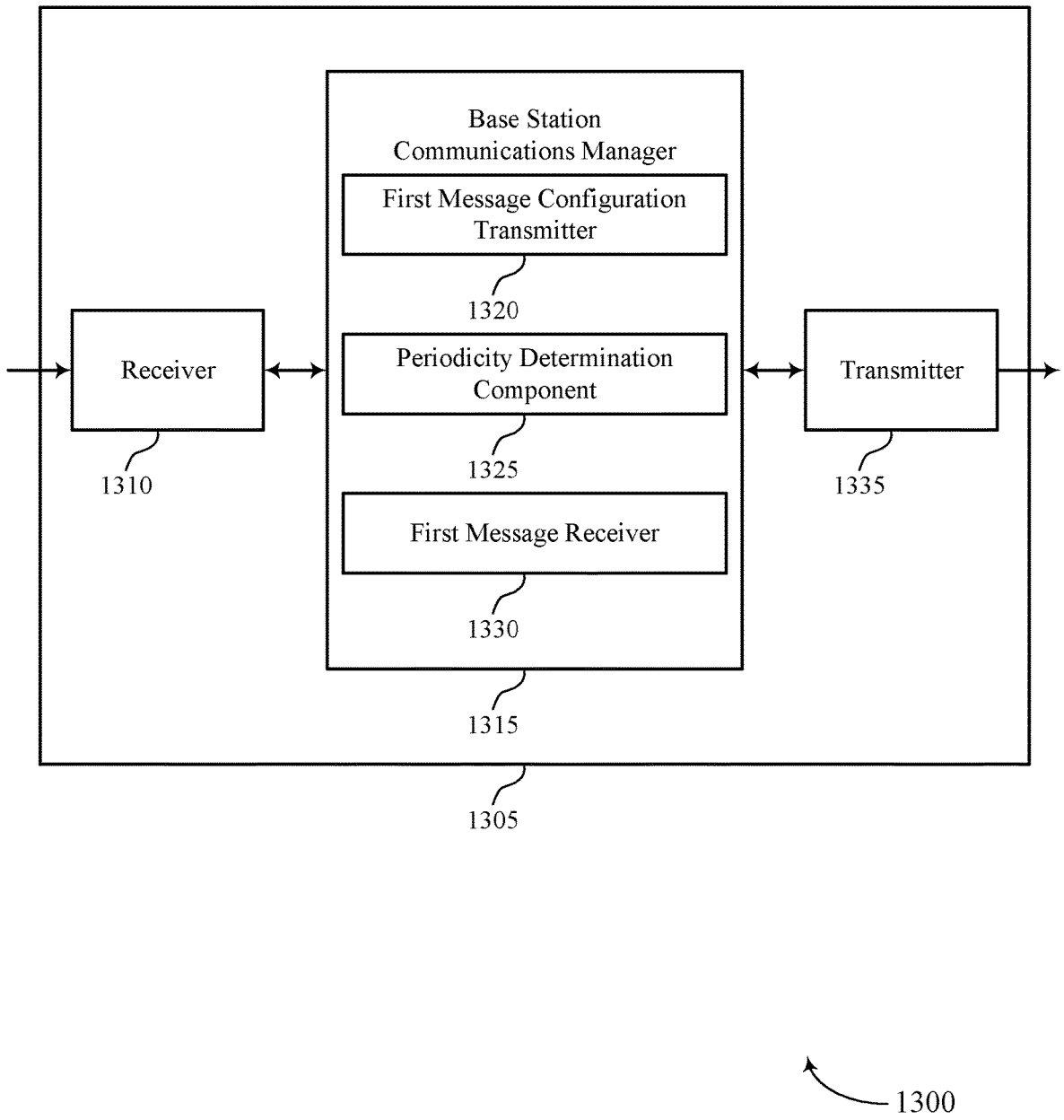

FIG. 13 shows a block diagram 1300 of a device 1305 that supports two-step RACH configuration period in accordance with aspects of the present disclosure. The device 1305 may be an example of aspects of a device 1205, or a base station 105 as described herein. The device 1305 may include a receiver 1310, a base station communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to two-step RACH configuration period, etc.). Information may be passed on to other components of the device 1305. The receiver 1310 may be an example of aspects of the transceiver 1520 described with reference to FIG. 15. The receiver 1310 may utilize a single antenna or a set of antennas.

The base station communications manager 1315 may be an example of aspects of the base station communications manager 1215 as described herein. The base station communications manager 1315 may include a first message configuration transmitter 1320, a periodicity determination component 1325, and a first message receiver 1330. The base station communications manager 1315 may be an example of aspects of the base station communications manager 1510 described herein.

The first message configuration transmitter 1320 may transmit, to a UE, a configuration message for a two-step RACH procedure, the configuration message including periodical configuration information for transmission of a preamble and transmission of a payload by the UE, the preamble and the payload associated with a first message of the two-step RACH procedure.

The periodicity determination component 1325 may determine a first configuration periodicity for receiving the preamble and a second configuration periodicity for receiving the payload based on the configuration message.

The first message receiver 1330 may receive, from the UE, the preamble of the first message based on the first configuration periodicity and the payload of the first message based on the second configuration periodicity.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
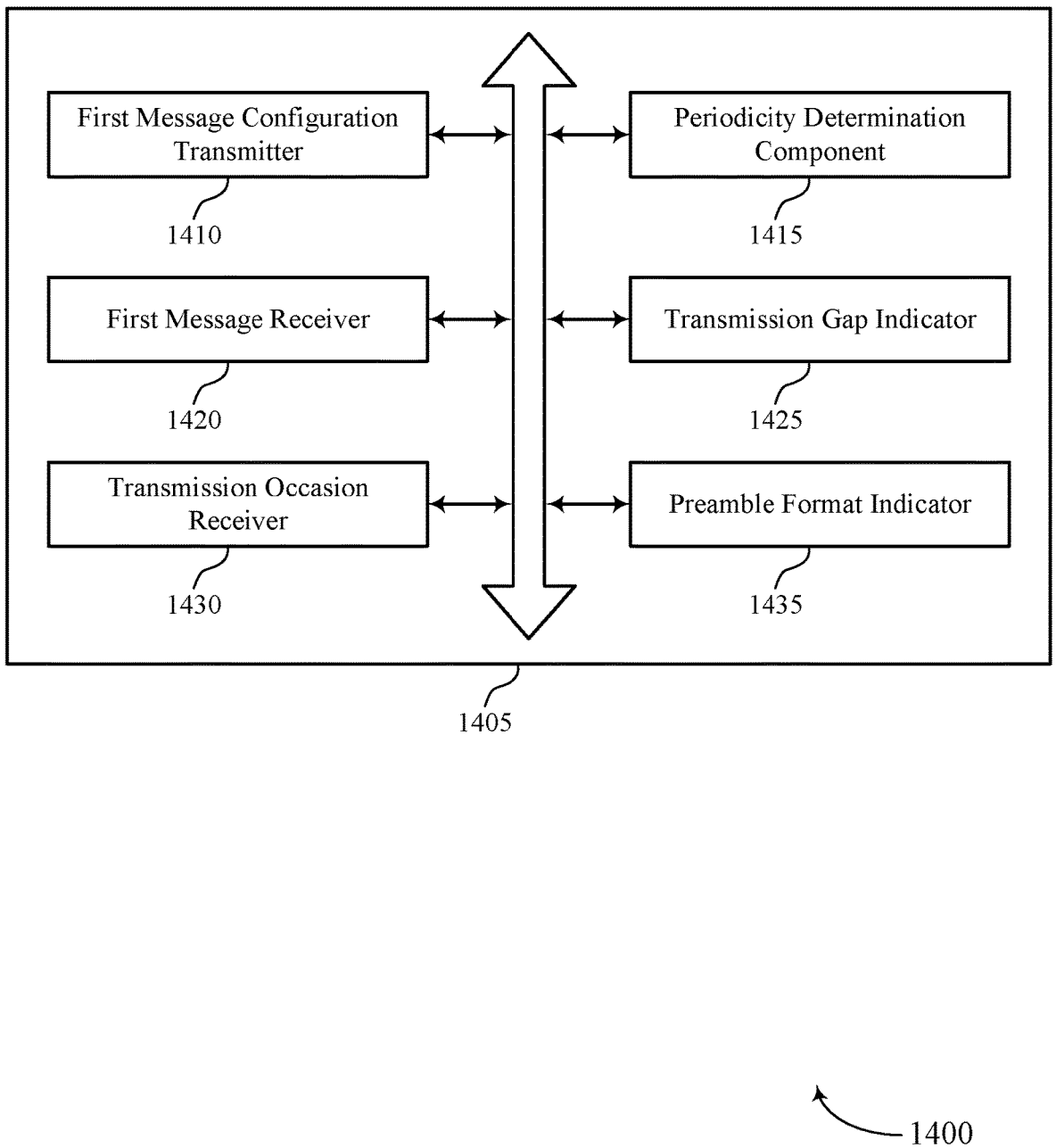
FIG. 14 shows a block diagram of a base station communications manager that supports two-step RACH configuration period in accordance with aspects of the present disclosure.

FIG. 14 shows a block diagram 1400 of a base station communications manager 1405 that supports two-step RACH configuration period in accordance with aspects of the present disclosure. The base station communications manager 1405 may be an example of aspects of a base station communications manager 1215, a base station communications manager 1315, or a base station communications manager 1510 described herein. The base station communications manager 1405 may include a first message configuration transmitter 1410, a periodicity determination component 1415, a first message receiver 1420, a transmission gap indicator 1425, a transmission occasion receiver 1430, and a preamble format indicator 1435. Each of these modules may communicate, directly or indirectly, with one another (e.g., via one or more buses).

The first message configuration transmitter 1410 may transmit, to a UE, a configuration message for a two-step RACH procedure, the configuration message including periodical configuration information for transmission of a preamble and transmission of a payload by the UE, the preamble and the payload associated with a first message of the two-step RACH procedure. In some examples, the first message configuration transmitter 1410 may transmit, to the UE, the configuration message via RRC signaling or via an SI transmission.

The periodicity determination component 1415 may determine a first configuration periodicity for receiving the preamble and a second configuration periodicity for receiving the payload based on the configuration message. In some examples, the periodicity determination component 1415 may determine the second configuration periodicity based on a periodicity relationship with the first configuration periodicity. For example, the periodicity relationship may be defined as $T_{RO,2step} = N \times T_{PO,2step}$) where $T_{RO,2step}$ may be the first configuration periodicity associated with the preamble of the first message, $T_{PO,2step}$ may be the second configuration periodicity associated with the payload of the first message, and N may be a configurable integer greater than or equal to one as indicated in the configuration message.

Additionally or alternatively, the periodicity determination component 1415 may determine the first configuration periodicity based on a periodicity relationship with a periodicity of a first message configuration in a four-step RACH procedure. For example, the periodicity relationship may be defined as $T_{RO,2step} = \lambda \times T_{RO,4step}$, where $T_{RO,2step}$ may be the first configuration periodicity associated with the preamble of the first message, $T_{RO,4step}$ may be the periodicity of the first message configuration in the four-step RACH procedure, and $\lambda$ may be a scaling factor, the scaling factor including an integer greater than or equal to one as indicated in the configuration message.

In some cases, the periodicity determination component 1415 may determine a frame for the first configuration periodicity based on a frame relationship with a periodicity of one or more RACH occasions of a four-step RACH procedure. For example, the frame relationship may be defined as $(n_{SFN} \bmod T_{RO,2step}) = ((y+\Delta y) \bmod T_{RO,2step})$, where $T_{RO,2step}$ may be the first configuration periodicity, $n_{SFN}$ may be a frame number for transmission occasions of the preamble and the payload of the first message of the two-step RACH procedure, y may be a frame number for the one or more RACH occasions of the four-step RACH procedure, and $\Delta y$ may be a time offset in frames. In some examples, the periodicity determination component 1415 may transmit $\Delta y$ in the configuration message, an additional configuration message, an SI transmission, or a combination thereof.

Additionally or alternatively, the periodicity determination component 1415 may determine a subframe or slot for the first configuration periodicity based on a subframe relationship with a periodicity of one or more RACH occasions of a four-step RACH procedure. For example, the subframe relationship may be defined as $(S_n + \Delta s) \bmod L$, where $S_n$ may be a subframe or slot number containing a RACH occasions of the four-step RACH procedure, $\Delta s$ may be a time offset in subframes or slots, and L may be a constant denoting a number of subframes or slots in a frame The first message receiver 1420 may receive, from the UE, the preamble of the first message based on the first configuration periodicity and the payload of the first message based on the second configuration periodicity. In some cases, the preamble and the payload of the first message may be received within a same bandwidth, partially overlapping bandwidths, or disjoint bandwidths.

The transmission gap indicator 1425 may transmit, to the UE, a transmission gap in the configuration message, the transmission gap indicating a time duration between transmission of the preamble and transmission of the payload. In some examples, the transmission gap indicator 1425 may receive, from the UE, the payload of the first message after the transmission gap.

The transmission occasion receiver 1430 may receive, from the UE, the preamble of the first message in at least one RACH occasion, the at least one RACH occasion occurring based on the first configuration periodicity. Additionally, the transmission occasion receiver 1430 may receive, from the UE, the payload of the first message in at least one uplink shared data channel occasion, the at least one uplink shared data channel occasion occurring based on the second configuration periodicity. In some examples, the transmission occasion receiver 1430 may identify the one or more uplink shared data channel occasions associated with each RACH occasion based on a preamble sequence grouping. In some cases, each RACH occasion may be associated with one or more uplink shared data channel occasions. Additionally, the one or more uplink shared data channel occasions may include a same MCS, payload size, waveform, or a combination thereof.

The preamble format indicator 1435 may transmit, to the UE, a set of preamble formats, a transmission gap, or a combination thereof, in the configuration message for the two-step RACH procedure. Accordingly, the preamble format indicator 1435 may receive, from the UE, the preamble of the first message with one preamble format of the set of preamble formats. In some cases, the preamble and the payload of the first message may be received within a same slot or on different slots based on the selected preamble format, the transmission gap, or a combination thereof.

Figure 15:
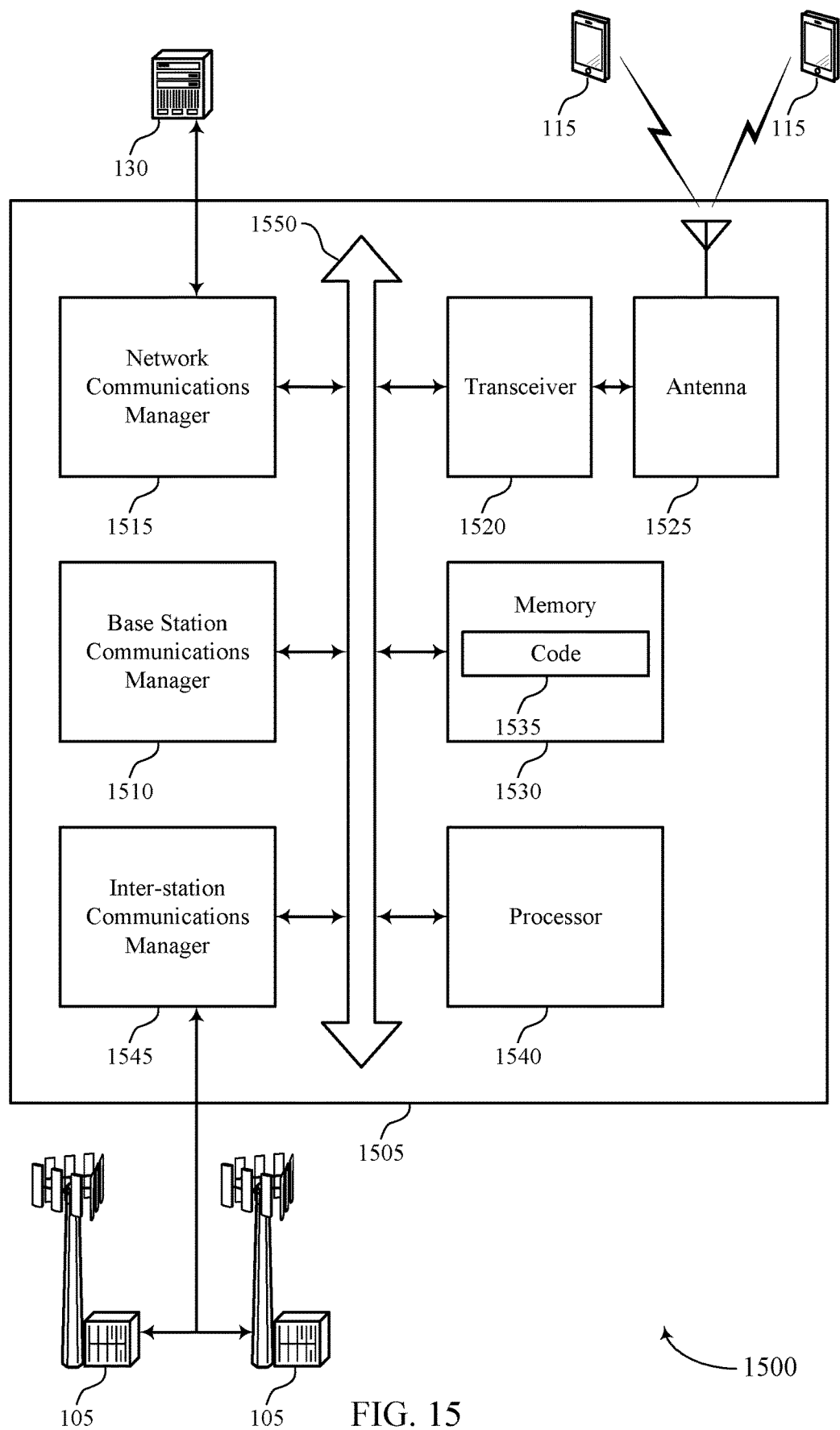
FIG. 15 shows a diagram of a system including a device that supports two-step RACH configuration period in accordance with aspects of the present disclosure.

FIG. 15 shows a diagram of a system 1500 including a device 1505 that supports two-step RACH configuration period in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a base station communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The base station communications manager 1510 may transmit, to a UE, a configuration message for a two-step RACH procedure, the configuration message including periodical configuration information for transmission of a preamble and transmission of a payload by the UE, the preamble and the payload associated with a first message of the two-step RACH procedure. In some cases, the base station communications manager 1510 may determine a first configuration periodicity for receiving the preamble and a second configuration periodicity for receiving the payload based on the configuration message. Accordingly, the base station communications manager 1510 may receive, from the UE, the preamble of the first message based on the first configuration periodicity and the payload of the first message based on the second configuration periodicity.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting two-step RACH configuration period).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
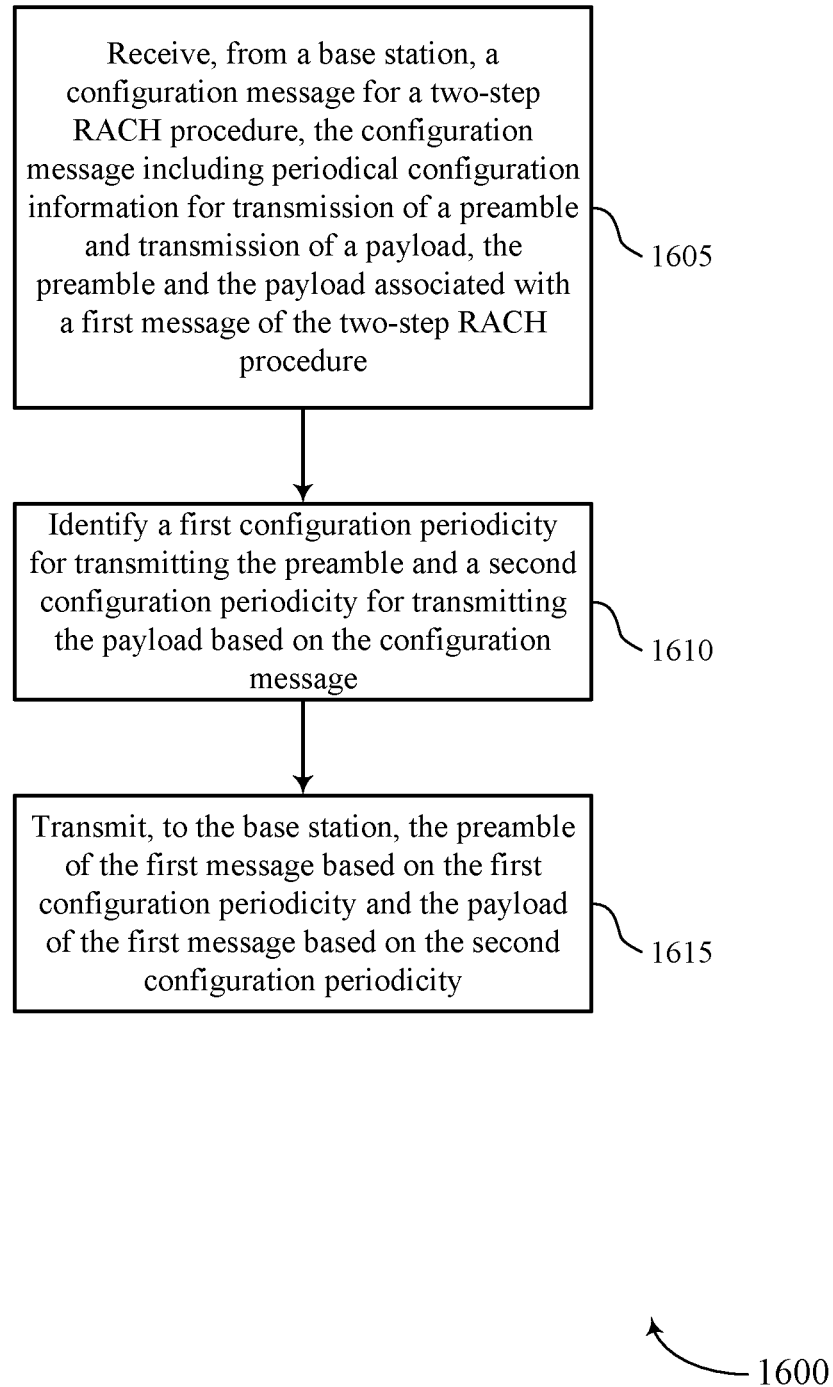
FIGS. 16 through 20 show flowcharts illustrating methods that support two-step RACH configuration period in accordance with aspects of the present disclosure.

FIG. 16 shows a flowchart illustrating a method 1600 that supports two-step RACH configuration period in accordance with aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a configuration message for a two-step RACH procedure, the configuration message including periodical configuration information for transmission of a preamble and transmission of a payload, the preamble and the payload associated with a first message of the two-step RACH procedure. The operations of 1605 may be performed according to the methods described herein. In some examples, aspects of the operations of 1605 may be performed by a first message configuration component as described with reference to FIGS. 8 through 11.

At 1610, the UE may identify a first configuration periodicity for transmitting the preamble and a second configuration periodicity for transmitting the payload based on the configuration message. The operations of 1610 may be performed according to the methods described herein. In some examples, aspects of the operations of 1610 may be performed by a periodicity identifier as described with reference to FIGS. 8 through 11.

At 1615, the UE may transmit, to the base station, the preamble of the first message based on the first configuration periodicity and the payload of the first message based on the second configuration periodicity. The operations of 1615 may be performed according to the methods described herein. In some examples, aspects of the operations of 1615 may be performed by a first message transmission component as described with reference to FIGS. 8 through 11.

Figure 17:
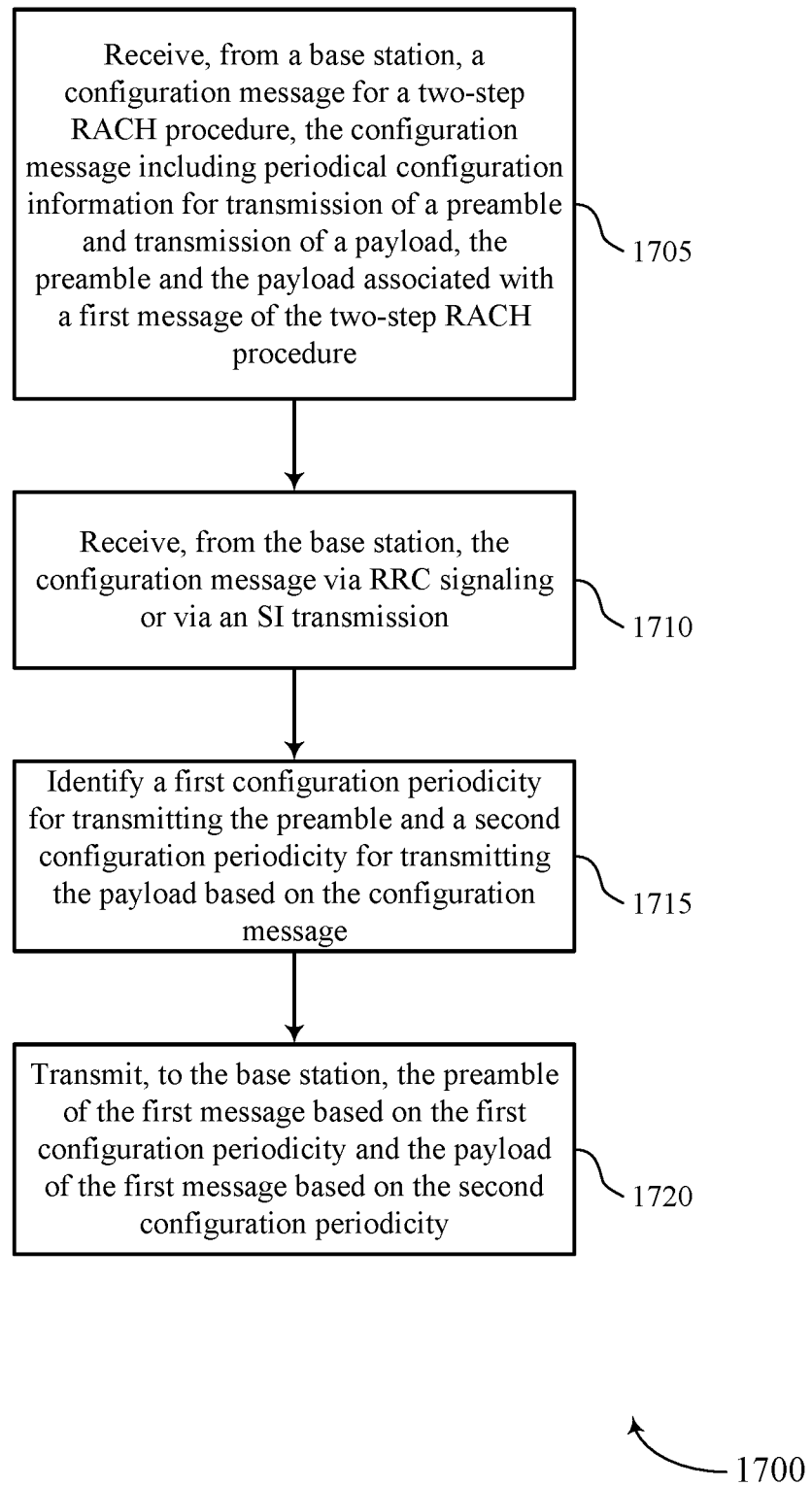

FIG. 17 shows a flowchart illustrating a method 1700 that supports two-step RACH configuration period in accordance with aspects of the present disclosure. The operations of method 1700 may be implemented by a UE 115 or its components as described herein. For example, the operations of method 1700 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a configuration message for a two-step RACH procedure, the configuration message including periodical configuration information for transmission of a preamble and transmission of a payload, the preamble and the payload associated with a first message of the two-step RACH procedure. The operations of 1705 may be performed according to the methods described herein. In some examples, aspects of the operations of 1705 may be performed by a first message configuration component as described with reference to FIGS. 8 through 11.

At 1710, the UE may receive, from the base station, the configuration message via RRC signaling or via an SI transmission. The operations of 1710 may be performed according to the methods described herein. In some examples, aspects of the operations of 1710 may be performed by a first message configuration component as described with reference to FIGS. 8 through 11.

At 1715, the UE may identify a first configuration periodicity for transmitting the preamble and a second configuration periodicity for transmitting the payload based on the configuration message. The operations of 1715 may be performed according to the methods described herein. In some examples, aspects of the operations of 1715 may be performed by a periodicity identifier as described with reference to FIGS. 8 through 11.

At 1720, the UE may transmit, to the base station, the preamble of the first message based on the first configuration periodicity and the payload of the first message based on the second configuration periodicity. The operations of 1720 may be performed according to the methods described herein. In some examples, aspects of the operations of 1720 may be performed by a first message transmission component as described with reference to FIGS. 8 through 11.

Figure 18:
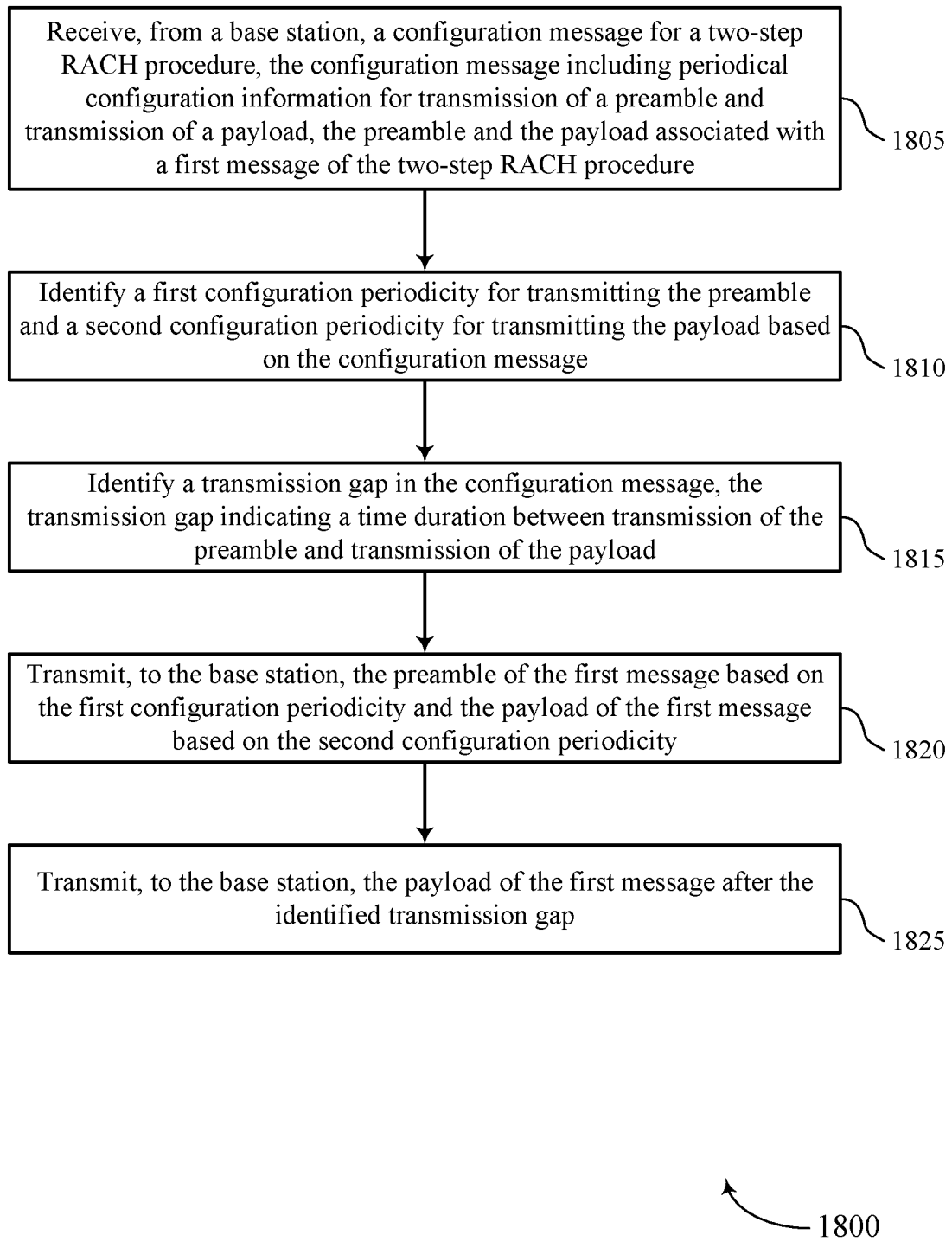

FIG. 18 shows a flowchart illustrating a method 1800 that supports two-step RACH configuration period in accordance with aspects of the present disclosure. The operations of method 1800 may be implemented by a UE 115 or its components as described herein. For example, the operations of method 1800 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, a configuration message for a two-step RACH procedure, the configuration message including periodical configuration information for transmission of a preamble and transmission of a payload, the preamble and the payload associated with a first message of the two-step RACH procedure. The operations of 1805 may be performed according to the methods described herein. In some examples, aspects of the operations of 1805 may be performed by a first message configuration component as described with reference to FIGS. 8 through 11.

At 1810, the UE may identify a first configuration periodicity for transmitting the preamble and a second configuration periodicity for transmitting the payload based on the configuration message. The operations of 1810 may be performed according to the methods described herein. In some examples, aspects of the operations of 1810 may be performed by a periodicity identifier as described with reference to FIGS. 8 through 11.

At 1815, the UE may identify a transmission gap in the configuration message, the transmission gap indicating a time duration between transmission of the preamble and transmission of the payload. The operations of 1815 may be performed according to the methods described herein. In some examples, aspects of the operations of 1815 may be performed by a transmission gap component as described with reference to FIGS. 8 through 11.

At 1820, the UE may transmit, to the base station, the preamble of the first message based on the first configuration periodicity and the payload of the first message based on the second configuration periodicity. The operations of 1820 may be performed according to the methods described herein. In some examples, aspects of the operations of 1820 may be performed by a first message transmission component as described with reference to FIGS. 8 through 11.

At 1825, the UE may transmit, to the base station, the payload of the first message after the identified transmission gap. The operations of 1825 may be performed according to the methods described herein. In some examples, aspects of the operations of 1825 may be performed by a transmission gap component as described with reference to FIGS. 8 through 11.

Figure 19:
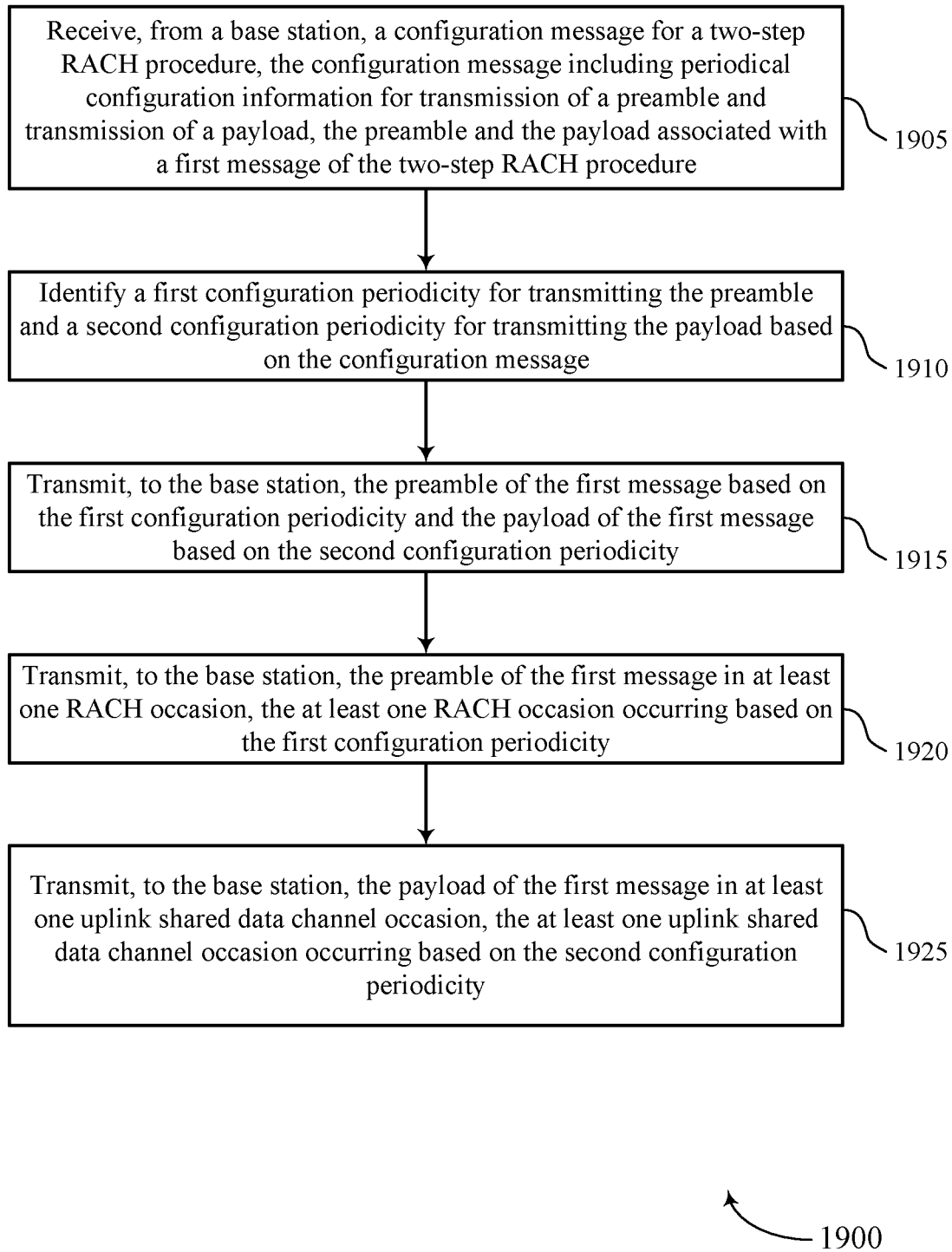

FIG. 19 shows a flowchart illustrating a method 1900 that supports two-step RACH configuration period in accordance with aspects of the present disclosure. The operations of method 1900 may be implemented by a UE 115 or its components as described herein. For example, the operations of method 1900 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, a configuration message for a two-step RACH procedure, the configuration message including periodical configuration information for transmission of a preamble and transmission of a payload, the preamble and the payload associated with a first message of the two-step RACH procedure. The operations of 1905 may be performed according to the methods described herein. In some examples, aspects of the operations of 1905 may be performed by a first message configuration component as described with reference to FIGS. 8 through 11.

At 1910, the UE may identify a first configuration periodicity for transmitting the preamble and a second configuration periodicity for transmitting the payload based on the configuration message. The operations of 1910 may be performed according to the methods described herein. In some examples, aspects of the operations of 1910 may be performed by a periodicity identifier as described with reference to FIGS. 8 through 11.

At 1915, the UE may transmit, to the base station, the preamble of the first message based on the first configuration periodicity and the payload of the first message based on the second configuration periodicity. The operations of 1915 may be performed according to the methods described herein. In some examples, aspects of the operations of 1915 may be performed by a first message transmission component as described with reference to FIGS. 8 through 11.

At 1920, the UE may transmit, to the base station, the preamble of the first message in at least one RACH occasion, the at least one RACH occasion occurring based on the first configuration periodicity. The operations of 1920 may be performed according to the methods described herein. In some examples, aspects of the operations of 1920 may be performed by a transmission occasion component as described with reference to FIGS. 8 through 11.

At 1925, the UE may transmit, to the base station, the payload of the first message in at least one uplink shared data channel occasion, the at least one uplink shared data channel occasion occurring based on the second configuration periodicity. The operations of 1925 may be performed according to the methods described herein. In some examples, aspects of the operations of 1925 may be performed by a transmission occasion component as described with reference to FIGS. 8 through 11.

Figure 20:
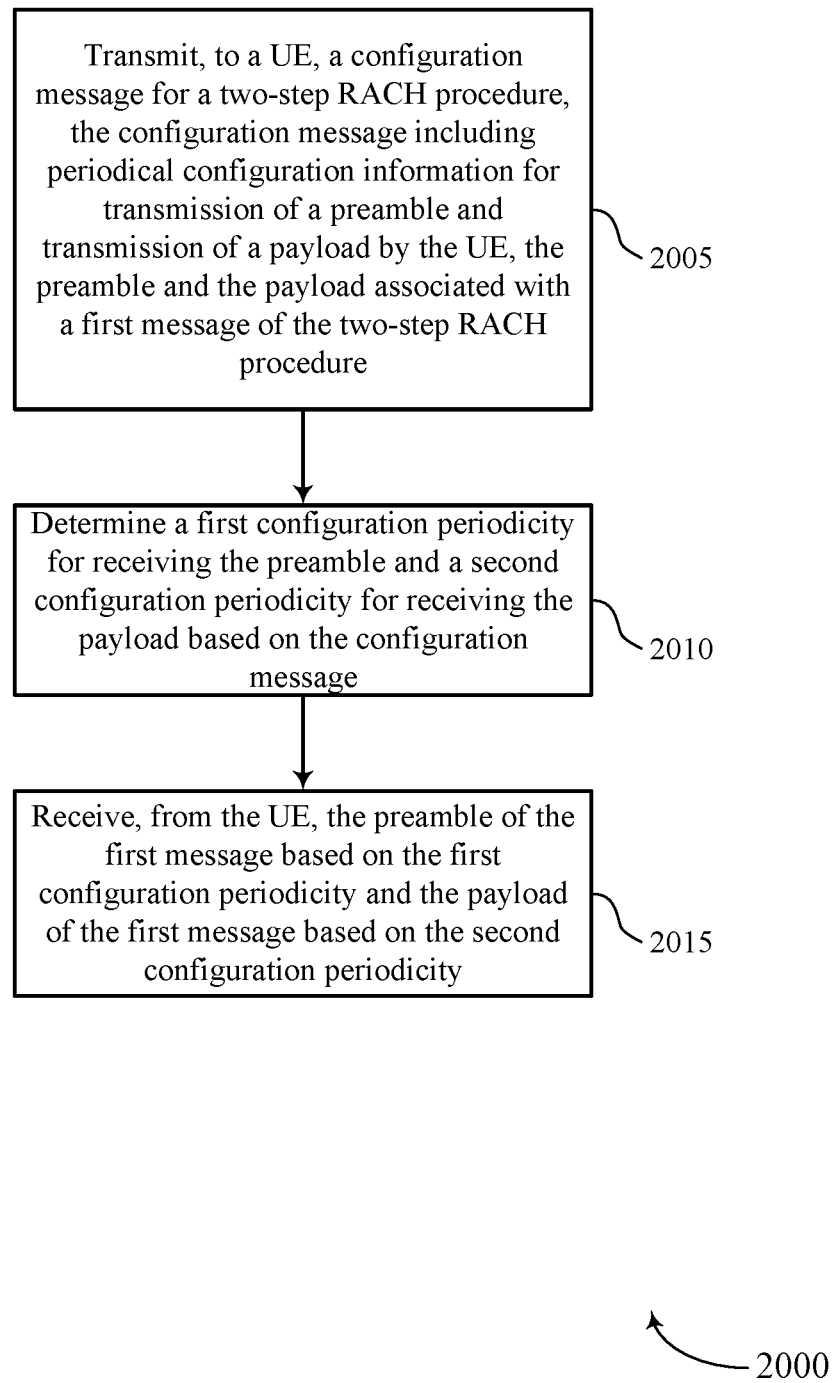

FIG. 20 shows a flowchart illustrating a method 2000 that supports two-step RACH configuration period in accordance with aspects of the present disclosure. The operations of method 2000 may be implemented by a base station 105 or its components as described herein. For example, the operations of method 2000 may be performed by a base station communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may transmit, to a UE, a configuration message for a two-step RACH procedure, the configuration message including periodical configuration information for transmission of a preamble and transmission of a payload by the UE, the preamble and the payload associated with a first message of the two-step RACH procedure. The operations of 2005 may be performed according to the methods described herein. In some examples, aspects of the operations of 2005 may be performed by a first message configuration transmitter as described with reference to FIGS. 12 through 15.

At 2010, the base station may determine a first configuration periodicity for receiving the preamble and a second configuration periodicity for receiving the payload based on the configuration message. The operations of 2010 may be performed according to the methods described herein. In some examples, aspects of the operations of 2010 may be performed by a periodicity determination component as described with reference to FIGS. 12 through 15.

At 2015, the base station may receive, from the UE, the preamble of the first message based on the first configuration periodicity and the payload of the first message based on the second configuration periodicity. The operations of 2015 may be performed according to the methods described herein. In some examples, aspects of the operations of 2015 may be performed by a first message receiver as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a configuration message for a two-step random access procedure, the configuration message comprising configuration information for periodic transmission of a preamble and periodic transmission of a payload, the preamble and the payload associated with a first message of the two-step random access procedure;
   identifying a first configuration periodicity for transmitting the preamble based at least in part on the configuration message;
   identifying a frame corresponding to the first configuration periodicity based at least in part on the configuration information indicating a time offset in frames associated with the frame;
   identifying a second configuration periodicity for transmitting the payload based at least in part on the configuration message, wherein the first configuration periodicity and the second configuration periodicity are separately configured; and
   transmitting the preamble of the first message in the identified frame based at least in part on the first configuration periodicity and the payload of the first message based at least in part on the second configuration periodicity.

2. The method of claim 1, wherein receiving the configuration message further comprises:
   receiving the configuration message via radio resource control signaling or via a system information transmission.

3. The method of claim 1, further comprising:
   identifying a transmission gap in the configuration message, the transmission gap indicating a time duration between transmission of the preamble and transmission of the payload; and
   transmitting the payload of the first message after the identified transmission gap.

4. The method of claim 1, wherein transmitting the preamble and the payload of the first message further comprises:
   transmitting the preamble of the first message in at least one random access occasion, the at least one random access occasion occurring based at least in part on the first configuration periodicity; and
   transmitting the payload of the first message in at least one uplink shared data channel occasion, the at least one uplink shared data channel occasion occurring based at least in part on the second configuration periodicity.

5. The method of claim 4, wherein each random access occasion is associated with one or more uplink shared data channel occasions.

6. The method of claim 5, further comprising:
   identifying the one or more uplink shared data channel occasions associated with each random access occasion based at least in part on a preamble sequence grouping.

7. The method of claim 6, wherein the one or more uplink shared data channel occasions comprise a same modulation and coding scheme, payload size, waveform, or a combination thereof.

8. The method of claim 1, further comprising:
   determining the second configuration periodicity based at least in part on a periodicity relationship with the first configuration periodicity.

9. The method of claim 8, wherein the periodicity relationship is defined as:

$$T_{RO,2step} = N \times T_{PO,2step},$$

where $T_{RO,2step}$ is the first configuration periodicity associated with the preamble of the first message, $T_{PO,2step}$ is the second configuration periodicity associated with the payload of the first message, and N is a configurable integer greater than or equal to one as indicated in the configuration message.

10. The method of claim 1, further comprising:
    determining the first configuration periodicity based at least in part on a periodicity relationship with a periodicity of a first message configuration in a four-step random access procedure.

11. The method of claim 10, wherein the periodicity relationship is defined as:

$$T_{RO,2step} = \lambda \times T_{RO,4step},$$

where $T_{RO,2step}$ is the first configuration periodicity associated with the preamble of the first message, $T_{RO,4step}$ is the periodicity of the first message configuration in the four-step random access procedure, and $\lambda$ is a scaling factor, the scaling factor comprising an integer greater than or equal to one as indicated in the configuration message.

12. The method of claim 1, further comprising:
    determining the frame for the first configuration periodicity based at least in part on a frame relationship with a periodicity of one or more random access occasions.

13. The method of claim 12, wherein the frame relationship is defined as:

$$(n_{SFN} \bmod T_{RO,2step}) = ((y + \Delta y) \bmod T_{RO,2step}),$$

where $T_{RO,2step}$ is the first configuration periodicity, $n_{SFN}$ is a frame number for transmission occasions of the preamble and the payload of the first message of the two-step random access procedure, y is a frame number for the one or more random access occasions, and $\Delta y$ is the time offset in frames.

14. The method of claim 13, further comprising:
    receiving $\Delta y$ in the configuration message, an additional configuration message, a system information transmission, or a combination thereof.

15. The method of claim 1, further comprising:
    determining a subframe or slot for the first configuration periodicity based at least in part on a subframe relationship with a periodicity of one or more random access occasions.

16. The method of claim 15, wherein the subframe relationship is defined as:

$$(S_n + \Delta s) \bmod L,$$

where $S_n$ is a subframe or slot number containing a random access occasions, $\Delta s$ is a time offset in subframes or slots, and L is a constant denoting a number of subframes or slots in the frame.

17. The method of claim 1, further comprising:
    identifying a plurality of preamble formats, a transmission gap, or a combination thereof, in the configuration message for the two-step random access procedure;
    selecting a preamble format from the plurality of preamble formats for transmission of the preamble of the first message; and transmitting the preamble of the first message with the selected preamble format.

18. The method of claim 17, wherein the preamble and the payload of the first message are transmitted within a same slot or on different slots based at least in part on the selected preamble format, the transmission gap, or a combination thereof.

19. The method of claim 1, wherein the preamble and the payload of the first message are transmitted within a same bandwidth, partially overlapping bandwidths, or disjoint bandwidths.

20. A method for wireless communications at a network device, comprising:
transmitting, to a user equipment (UE), a configuration message for a two-step random access procedure, the configuration message comprising configuration information for periodic transmission of a preamble and periodic transmission of a payload by the UE, the preamble and the payload associated with a first message of the two-step random access procedure;
determining a first configuration periodicity for receiving the preamble based at least in part on the configuration message;
determining a frame corresponding to the first configuration periodicity based at least in part on the configuration information indicating a time offset in frames associated with the frame;
determining a second configuration periodicity for receiving the payload based at least in part on the configuration message; and
receiving, from the UE, the preamble of the first message in the determined frame based at least in part on the first configuration periodicity and the payload of the first message based at least in part on the second configuration periodicity, wherein the first configuration periodicity and the second configuration periodicity are separately configured.

21. The method of claim 20, wherein transmitting the configuration message further comprises:
transmitting, to the UE, the configuration message via radio resource control signaling or via a system information transmission.

22. The method of claim 20, further comprising:
transmitting, to the UE, a transmission gap in the configuration message, the transmission gap indicating a time duration between transmission of the preamble and transmission of the payload; and
receiving, from the UE, the payload of the first message after the transmission gap.

23. The method of claim 20, wherein receiving the preamble and the payload of the first message further comprises:
receiving, from the UE, the preamble of the first message in at least one random access occasion, the at least one random access occasion occurring based at least in part on the first configuration periodicity; and
receiving, from the UE, the payload of the first message in at least one uplink shared data channel occasion, the at least one uplink shared data channel occasion occurring based at least in part on the second configuration periodicity.

24. The method of claim 20, further comprising:
determining the second configuration periodicity based at least in part on a periodicity relationship with the first configuration periodicity.

25. The method of claim 20, further comprising:
determining the first configuration periodicity based at least in part on a periodicity relationship with a periodicity of a first message configuration in a four-step random access procedure.

26. The method of claim 20, further comprising:
determining the frame for the first configuration periodicity based at least in part on a frame relationship with a periodicity of one or more random access occasions.

27. The method of claim 20, further comprising:
determining a subframe or slot for the first configuration periodicity based at least in part on a subframe relationship with a periodicity of one or more random access occasions.

28. The method of claim 20, further comprising:
transmitting, to the UE, a plurality of preamble formats, a transmission gap, or a combination thereof, in the configuration message for the two-step random access procedure; and
receiving, from the UE, the preamble of the first message with one preamble format from the plurality of preamble formats.

29. The method of claim 20, wherein the preamble and payload of the first message are received within a same bandwidth, partially overlapping bandwidths, or disjoint bandwidths.

30. An apparatus for wireless communications at a user equipment (UE), comprising:
at least one processor,
memory in electronic communication with the at least one processor, the memory storing instructions executable by the at least one processor to cause the apparatus to:
receive a configuration message for a two-step random access procedure, the configuration message comprising configuration information for periodic transmission of a preamble and periodic transmission of a payload, the preamble and the payload associated with a first message of the two-step random access procedure;
identify a first configuration periodicity for transmitting the preamble based at least in part on the configuration message;
identify a frame corresponding to the first configuration periodicity based at least in part on the configuration information indicating a time offset in frames associated with the frame;
identify a second configuration periodicity for transmitting the payload based at least in part on the configuration message, wherein the first configuration periodicity and the second configuration periodicity are separately configured; and
transmit the preamble of the first message in the identified frame based at least in part on the first configuration periodicity and the payload of the first message based at least in part on the second configuration periodicity.

31. The apparatus of claim 30, wherein the instructions to receive the configuration message further are executable by the at least one processor to cause the apparatus to:
receive the configuration message via radio resource control signaling or via a system information transmission.

32. The apparatus of claim 30, wherein the instructions are further executable by the at least one processor to cause the apparatus to:

identify a transmission gap in the configuration message, the transmission gap indicating a time duration between transmission of the preamble and transmission of the payload; and transmit the payload of the first message after the identified transmission gap.

33. The apparatus of claim 30, wherein the instructions to transmit the preamble and the payload of the first message further are executable by the at least one processor to cause the apparatus to:

transmit the preamble of the first message in at least one random access occasion, the at least one random access occasion occurring based at least in part on the first configuration periodicity; and transmit the payload of the first message in at least one uplink shared data channel occasion, the at least one uplink shared data channel occasion occurring based at least in part on the second configuration periodicity.

34. The apparatus of claim 33, wherein each random access occasion is associated with one or more uplink shared data channel occasions.

35. The apparatus of claim 34, wherein the instructions are further executable by the at least one processor to cause the apparatus to:

identify the one or more uplink shared data channel occasions associated with each random access occasion based at least in part on a preamble sequence grouping.

36. The apparatus of claim 35, wherein the one or more uplink shared data channel occasions comprise a same modulation and coding scheme, payload size, waveform, or a combination thereof.

37. The apparatus of claim 30, wherein the instructions are further executable by the at least one processor to cause the apparatus to:

determine the second configuration periodicity based at least in part on a periodicity relationship with the first configuration periodicity.

38. The apparatus of claim 37, wherein the periodicity relationship is defined as:

$$T_{RO,2step}=N \times T_{PO,2step},$$

where $T_{RO,2step}$ is the first configuration periodicity associated with the preamble of the first message, $T_{PO,2step}$ is the second configuration periodicity associated with the payload of the first message, and N is a configurable integer greater than or equal to one as indicated in the configuration message.

39. The apparatus of claim 30, wherein the instructions are further executable by the at least one processor to cause the apparatus to:

determine the first configuration periodicity based at least in part on a periodicity relationship with a periodicity of a first message configuration in a four-step random access procedure.

40. The apparatus of claim 39, wherein the periodicity relationship is defined as:

$$T_{RO,2step}=\lambda \times T_{RO,4step},$$

where $T_{RO,2step}$ is the first configuration periodicity associated with the preamble of the first message, $T_{RO,4step}$ is the periodicity of the first message configuration in the four-step random access procedure, and $\lambda$ is a scaling factor, the scaling factor comprising an integer greater than or equal to one as indicated in the configuration message.

41. The apparatus of claim 30, wherein the instructions are further executable by the at least one processor to cause the apparatus to:

determine the frame for the first configuration periodicity based at least in part on a frame relationship with a periodicity of one or more random access occasions.

42. The apparatus of claim 41, wherein the frame relationship is defined as:

$$(n_{SFN} \bmod T_{RO,2step})=((y+\Delta y) \bmod T_{RO,2step}),$$

where $T_{RO,2step}$ is the first configuration periodicity, $n_{SFN}$ is a frame number for transmission occasions of the preamble and the payload of the first message of the two-step random access procedure, y is a frame number for the one or more random access occasions, and $\Delta y$ is the time offset in frames.

43. The apparatus of claim 42, wherein the instructions are further executable by the at least one processor to cause the apparatus to:

receive $\Delta y$ in the configuration message, an additional configuration message, a system information transmission, or a combination thereof.

44. The apparatus of claim 30, wherein the instructions are further executable by the at least one processor to cause the apparatus to:

determine a subframe or slot for the first configuration periodicity based at least in part on a subframe relationship with a periodicity of one or more random access occasions.

45. The apparatus of claim 44, wherein the subframe relationship is defined as:

$$(S_n+\Delta s) \bmod L,$$

where $S_n$ is a subframe or slot number containing a random access occasions, $\Delta s$ is a time offset in subframes or slots, and L is a constant denoting a number of subframes or slots in a frame.

46. The apparatus of claim 30, wherein the instructions are further executable by the at least one processor to cause the apparatus to:

identify a plurality of preamble formats, a transmission gap, or a combination thereof, in the configuration message for the two-step random access procedure;

select a preamble format from the plurality of preamble formats for transmission of the preamble of the first message; and transmit the preamble of the first message with the selected preamble format.

47. The apparatus of claim 46, wherein the preamble and the payload of the first message are transmitted within a same slot or on different slots based at least in part on the selected preamble format, the transmission gap, or a combination thereof.

48. The apparatus of claim 30, wherein the preamble and the payload of the first message are transmitted within a same bandwidth, partially overlapping bandwidths, or disjoint bandwidths.

49. An apparatus for wireless communications at a network device, comprising:

at least one processor, memory in electronic communication with the at least one processor, the memory storing instructions executable by the at least one processor to cause the apparatus to:

transmit, to a user equipment (UE), a configuration message for a two-step random access procedure, the configuration message comprising configuration information for periodic transmission of a preamble and periodic transmission of a payload by the UE, the preamble and the payload associated with a first message of the two-step random access procedure;
determine a first configuration periodicity for receiving the preamble based at least in part on the configuration message;
determine a frame corresponding to the first configuration periodicity based at least in part on the configuration information indicating a time offset in frames associated with the frame;
determine a second configuration periodicity for receiving the payload based at least in part on the configuration message; and
receive, from the UE, the preamble of the first message in the determined frame based at least in part on the first configuration periodicity and the payload of the first message based at least in part on the second configuration periodicity, wherein the first configuration periodicity and the second configuration periodicity are separately configured.

50. The apparatus of claim 49, wherein the instructions to transmit the configuration message further are executable by the at least one processor to cause the apparatus to:
transmit, to the UE, the configuration message via radio resource control signaling or via a system information transmission.

51. The apparatus of claim 49, wherein the instructions are further executable by the at least one processor to cause the apparatus to:
transmit, to the UE, a transmission gap in the configuration message, the transmission gap indicating a time duration between transmission of the preamble and transmission of the payload; and
receive, from the UE, the payload of the first message after the transmission gap.

52. The apparatus of claim 49, wherein the instructions to receive the preamble and the payload of the first message further are executable by the at least one processor to cause the apparatus to:
receive, from the UE, the preamble of the first message in at least one random access occasion, the at least one random access occasion occurring based at least in part on the first configuration periodicity; and
receive, from the UE, the payload of the first message in at least one uplink shared data channel occasion, the at least one uplink shared data channel occasion occurring based at least in part on the second configuration periodicity.

53. The apparatus of claim 49, wherein the instructions are further executable by the at least one processor to cause the apparatus to:
determine the second configuration periodicity based at least in part on a periodicity relationship with the first configuration periodicity.

54. The apparatus of claim 49, wherein the instructions are further executable by the at least one processor to cause the apparatus to:
determine the first configuration periodicity based at least in part on a periodicity relationship with a periodicity of a first message configuration in a four-step random access procedure.

55. The apparatus of claim 49, wherein the instructions are further executable by the at least one processor to cause the apparatus to:
determine the frame for the first configuration periodicity based at least in part on a frame relationship with a periodicity of one or more random access occasions.

56. The apparatus of claim 49, wherein the instructions are further executable by the at least one processor to cause the apparatus to:
determine a subframe or slot for the first configuration periodicity based at least in part on a subframe relationship with a periodicity of one or more random access occasions.

57. The apparatus of claim 49, wherein the instructions are further executable by the at least one processor to cause the apparatus to:
transmit, to the UE, a plurality of preamble formats, a transmission gap, or a combination thereof, in the configuration message for the two-step random access procedure; and
receive, from the UE, the preamble of the first message with one preamble format from the plurality of preamble formats.

58. The apparatus of claim 49, wherein the preamble and the payload of the first message are received within a same bandwidth, partially overlapping bandwidths, or disjoint bandwidths.

59. An apparatus for wireless communications at a user equipment (UE), comprising:
means for receiving a configuration message for a two-step random access procedure, the configuration message comprising configuration information for periodic transmission of a preamble and periodic transmission of a payload, the preamble and the payload associated with a first message of the two-step random access procedure;
means for identifying a first configuration periodicity for transmitting the preamble based at least in part on the configuration message;
means for identifying a frame corresponding to the first configuration periodicity based at least in part on the configuration information indicating a time offset in frames associated with the frame;
means for identifying a second configuration periodicity for transmitting the payload based at least in part on the configuration message, wherein the first configuration periodicity and the second configuration periodicity are separately configured; and
means for transmitting the preamble of the first message in the identified frame based at least in part on the first configuration periodicity and the payload of the first message based at least in part on the second configuration periodicity.

60. An apparatus for wireless communications at a network device, comprising:
means for transmitting, to a user equipment (UE), a configuration message for a two-step random access procedure, the configuration message comprising configuration information for periodic transmission of a preamble and periodic transmission of a payload by the UE, the preamble and the payload associated with a first message of the two-step random access procedure;
means for determining a first configuration periodicity for receiving the preamble based at least in part on the configuration message;
means for determining a frame corresponding to the first configuration periodicity based at least in part on the configuration information indicating a time offset in frames associated with the frame;
means for determining a second configuration periodicity for receiving the payload based at least in part on the configuration message; and means for receiving, from the UE, the preamble of the first message in the determined frame based at least in part on the first configuration periodicity and the payload of the first message based at least in part on the second configuration periodicity, wherein the first configuration periodicity and the second configuration periodicity are separately configured.

61. A non-transitory computer-readable medium storing code for wireless communications at a user equipment (UE), the code comprising instructions executable by at least one processor to:
  receive a configuration message for a two-step random access procedure, the configuration message comprising configuration information for periodic transmission of a preamble and periodic transmission of a payload, the preamble and the payload associated with a first message of the two-step random access procedure;
  identify a first configuration periodicity for transmitting the preamble based at least in part on the configuration message;
  identify a frame corresponding to the first configuration periodicity based at least in part on the configuration information indicating a time offset in frames associated with the frame;
  identify a second configuration periodicity for transmitting the payload based at least in part on the configuration message, wherein the first configuration periodicity and the second configuration periodicity are separately configured; and
  transmit the preamble of the first message in the identified frame based at least in part on the first configuration periodicity and the payload of the first message based at least in part on the second configuration periodicity.

62. A non-transitory computer-readable medium storing code for wireless communications at a network device, the code comprising instructions executable by at least one processor to:
  transmit, to a user equipment (UE), a configuration message for a two-step random access procedure, the configuration message comprising configuration information for periodic transmission of a preamble and periodic transmission of a payload by the UE, the preamble and the payload associated with a first message of the two-step random access procedure;
  determine a first configuration periodicity for receiving the preamble based at least in part on the configuration message;
  determine a frame corresponding to the first configuration periodicity based at least in part on the configuration information indicating a time offset in frames associated with the frame;
  determine a second configuration periodicity for receiving the payload based at least in part on the configuration message; and
  receive, from the UE, the preamble of the first message in the determined frame based at least in part on the first configuration periodicity and the payload of the first message based at least in part on the second configuration periodicity, wherein the first configuration periodicity and the second configuration periodicity are separately configured.

* * * * *